United States Patent [19]

Maruyama et al.

[11] 4,179,602

[45] Dec. 18, 1979

[54] METHOD AND SYSTEM OF VELOCITY CONTROL FOR AUTOMATIC WELDING APPARATUS

[75] Inventors: Shigeo Maruyama, Nishinomiya; Yuji Nishikaiji, Takarazuka; Tatsuya Miura; Shigeki Fujinaga, both of Nishinomiya, all of Japan

[73] Assignee: Shin Meiwa Industry Co., Ltd., Japan

[21] Appl. No.: 815,783

[22] Filed: Jul. 14, 1977

[30] Foreign Application Priority Data

| Jul. 16, 1976 | [JP] | Japan | 51-85427 |
| Jul. 23, 1976 | [JP] | Japan | 51-88448 |
| Jul. 23, 1976 | [JP] | Japan | 51-88449 |
| Jul. 23, 1976 | [JP] | Japan | 51-88450 |
| Jan. 20, 1977 | [JP] | Japan | 52-6280 |
| Mar. 30, 1977 | [JP] | Japan | 52-36422 |
| Mar. 30, 1977 | [JP] | Japan | 52-36423 |

[51] Int. Cl.$^2$ ............................................. B23K 9/12
[52] U.S. Cl. ................................. 219/125.1; 318/573
[58] Field of Search ....................... 219/124.1, 125.1; 318/561, 567, 568, 570, 573, 574, 575

[56] References Cited

U.S. PATENT DOCUMENTS

| 3,555,239 | 1/1971 | Kerth | 318/574 |
| 3,746,955 | 7/1973 | Kobayashi | 318/561 |
| 3,748,563 | 7/1973 | Pomella et al. | 318/573 |
| 3,783,253 | 1/1974 | Anderson et al. | 318/573 |
| 3,943,343 | 3/1976 | Irie | 318/568 |
| 3,969,615 | 7/1976 | Bowers et al. | 318/574 |
| 4,014,495 | 3/1977 | Oda et al. | 219/125.1 |
| 4,031,369 | 6/1977 | Heaman et al. | 318/573 |

Primary Examiner—Bruce A. Reynolds
Assistant Examiner—Clifford C. Shaw
Attorney, Agent, or Firm—Staas & Halsey

[57] ABSTRACT

A method and system of velocity control for an automatic welding apparatus, wherein at least either a welding torch or a workpiece is movable in the directions of the three rectangular axes and point-to-point (PTP) position control of the torch and workpiece is effected between two preset positions at a preset relative velocity. In effecting the PTP position control, the direction of movement is determined based on information about the two preset positions, and the components of the preset velocity in the directions of the three rectangular axes are determined based on the direction of movement thus found and also based on information about the preset velocity, these components being used as instruction velocities in the respective axes.

60 Claims, 37 Drawing Figures

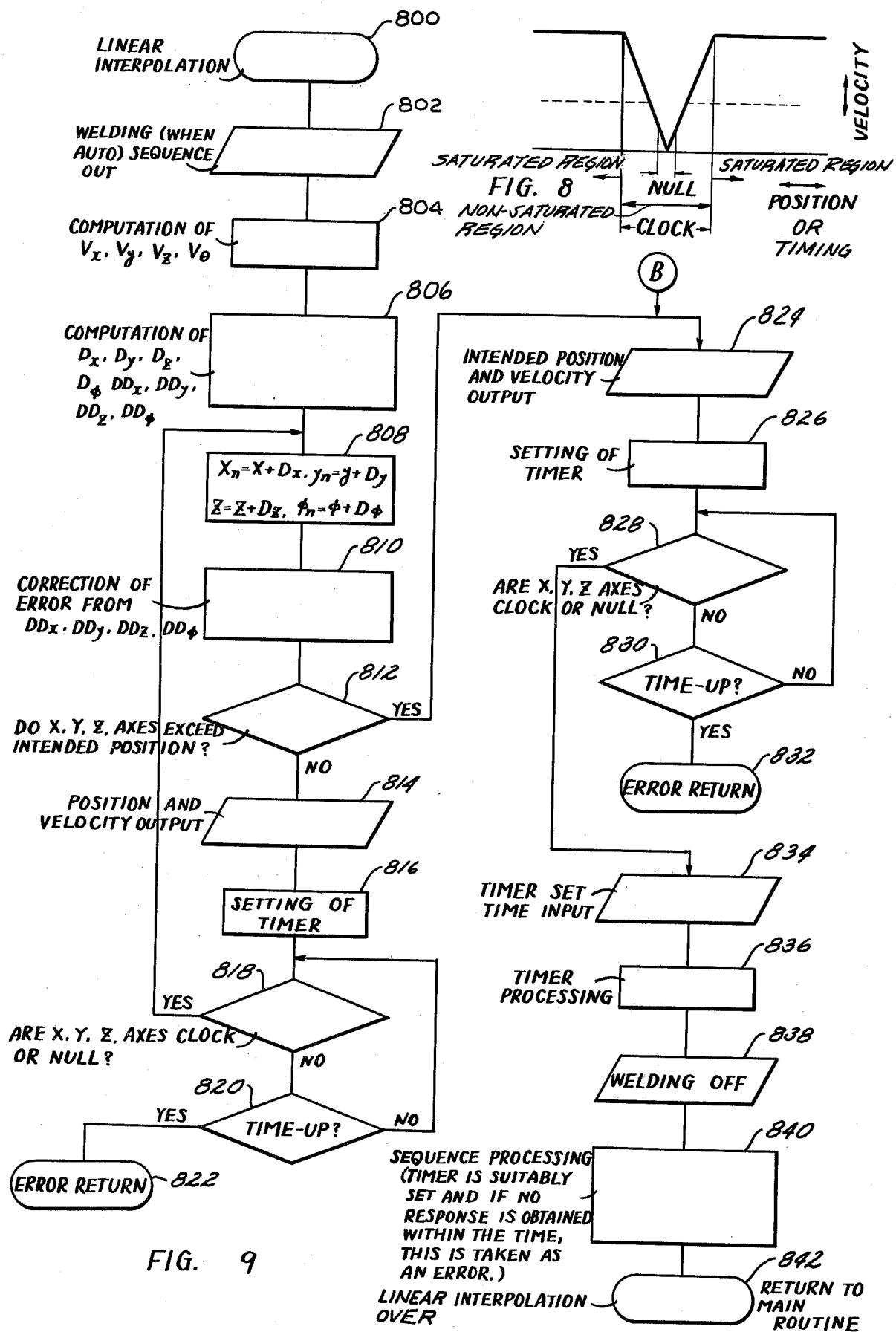

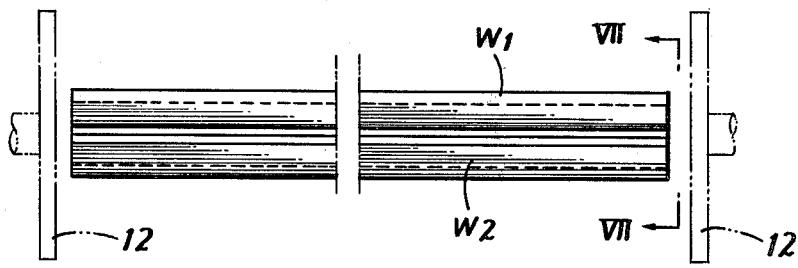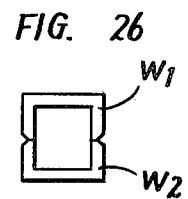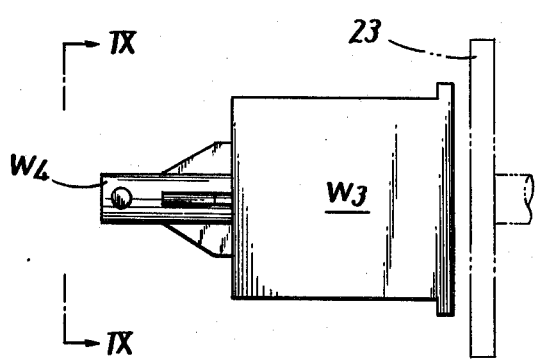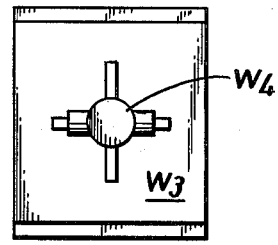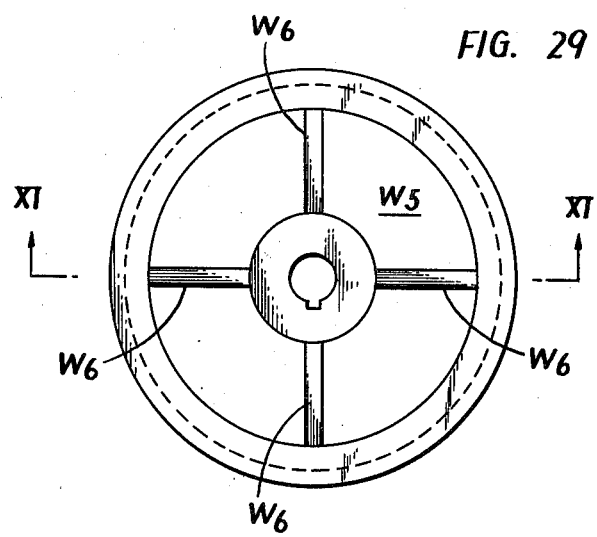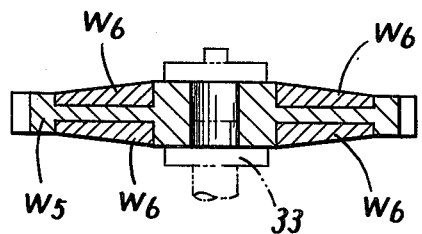
FIG. 25
FIG. 26
FIG. 27
FIG. 28
FIG. 29
FIG. 30

METHOD AND SYSTEM OF VELOCITY CONTROL FOR AUTOMATIC WELDING APPARATUS

BACKGROUND OF THE INVENTION

1. Field of the Invention

The present invention relates to a method and system of velocity control for an automatic welding apparatus. More particularly, it relates to a method and system of velocity control for an automatic welding apparatus, wherein position control is effected while making linear interpolations between two points which are indicated by, for example, the rectangular coordinate system.

2. Description of the Prior Art

The position control devices heretofore used in automatic welding apparatuses may be divided broadly into two types, the PTP (Point To Point) type and the CP (Continuous Path) type. The PTP type position control device is simple in construction and inexpensive but its operation is not continuous. On the other hand, the CP type position control device is continuous in its operation but is complicated in construction and difficult to operate. Therefore, the PTP type position control device is being improved for practical use. In such a PTP type position control device, linear interpolations are necessary to effect a linear movement which is not along control axes (X, Y, Z) in, for example, the rectangular coordinate system.

For example, in conventional NC (Numerical Control), various linear interpolation systems are known, including the MIT system, the DDA system and the algebraic operation system. Any of these systems effect feed control along a straight line connecting two indicated points while correcting errors or deviations from said straight line, and the position control effected is accurate. However, the control operaton or program therefor is complicated and it tends to be more difficult if feed speed has to be controlled accurately.

As for a method of controlling a controlled object to a specified feed speed, there is a method using a tape which specifies the reciprocal of the time required to travel a specified distance (or this reciprocal multiplied by a suitable coefficient), the (feed speed coefficient (FRN). According to such method which specifies F or FRN or a tape, although the feed speed is accurate, the computation involved is troublesome.

Therefore, there is another method in which a numerical value specifies a feed speed, such feed speed itself being directly specified, and a suitable circuit in the control device is used to effect pulse distribution to assure that the feed speed will be exactly as specified. However, such method which specifies an absolute velocity on a tape encounters the problem of lack of versatility in that different tapes serving as programs have to be used for different operations.

As described above, the interpolation process can be carried out by a computer, for example, but the recent progress in the technology of semiconductors has made a single chip type microprocessor or microcomputer available. However, such microprocessor or microcomputer is limited in its computing function and generally its computing speed is low. Therefore, the use of a microprocessor or microcomputer for the purpose of reducing the cost of the apparatus would lead to the problem of the processing rate being low due to its low computing speed.

In the conventional PTP control in an automatic welding apparatus, the controlled object (for example, the torch) is stopped at each indicated point. Therefore, if it is desired to effect a nearly curvilinear control operation by increasing the number of indicated points, then the number of stop points increases, thus resulting in a poor welding finish. To overcome this difficulty, it would be thought advisable to cut off the welding current whenever the control object is stopped. In that case, however, the welding finish would not always be satisfactory while the construction would be further complicated and the welding operation would involve a substantial loss of time.

Heretofore, for example, in the case of arc welding, an automatic welding machine has been realized. The welding capacity of the torch in such arc welding is limited to a certain value, and hence, when the plate thickness of an object to be welded (workpiece) is increased, it is impossible to achieve the complete penetration of the melt into the interface in the case of butt welding.

Therefore, as in kncwn in the art, with consideration given to the conditions including the plate thickness and welding torch capacity, wearing has been resorted to for better welding results. In such a conventional automatic welding machine which performs weaving (a welding machine which causes the welding torch to automatically trace a welding line in a plane), the welding torch is mechanically swung or moved to and fro across the welding line, or a rotating magnetic field is applied to the arc to swing the welding point. However, as described above, the prior art encounters various problems:, the presence of mechanical inertia; the additional space required to install attachments (including mechanical swing means and magnetic field applying means) around the welding torch; the increased weight of the apparatus; and the difficulty which arises in connection with changing the weaving conditions. Further, in an automatic welding machine using a polar coordinate system type robot, weaving control can be effected by interpolations made by a control circuit, but there arises a new problem is that this control circuit is complicated.

It has been proposed to use the rectangular coordinate system to effect weaving control. In such weaving control system of interest, there remains the problem that the direction of a welding line (that is, the direction of movement of the torch) should be parallel with one of the axes X, Y, Z of the rectangular coordinate system. This means that in fixing a workpiece, very accurate positioning is required, and moreover, a complicated workpiece needs to have its position changed for each welding operation, resulting in the drawback that continuous weaving cannot be carried out in different directions.

In preparing a program for an automatic welding apparatus, as described above, the operator tends to be absorbed in position instructions, thus forgetting other instructions. As a result, mistakes in program teaching often occur. In order to preclude faults otherwise caused by a malfunction due to such mistakes, it is desirable to check on errors at the time of program teaching.

In positioning a controlled object in such a automatic welding apparatus, unforseeable accidents often occur in which the controlled objects collides with other objects, often damaging machine parts. Such collision accidents occur most frequently especially in connection with teaching at the time of playback because the manual operation thereof tends to be carried out in a wrong way.

SUMMARY OF THE INVENTION

Accordingly, a principal object of the invention is to provide a velocity control method and system which, in cases where positional accuracy need not be so critical as in an automatic welding apparatus, is capable of relatively easily making linear interpolations and controlling the feed speed.

Another object of the invention is to provide a method and system of velocity control for an automatic welding apparatus wherein, when a workpiece is rotated around the axis of an attaching shaft, the control of the rotative angle can be achieved at a specified speed.

A further object of the invention is to provide a method and system of correcting errors in a position control device capable of relatively high speed treatment, even in the case of using a relatively simple data processing unit.

A further object of the invention is to provide a control method and system for a position control device which is of the PTP type, and yet is capable of continuously controlling the position of a controlled body.

A further object of the invention is to provide an automatic welding apparatus having the function of checking on program teaching errors.

A further object of the invention is to provide a method and system of position control wherein, when a controlled object is about to collide with another object during the positioning of said controlled object, the output from a sensor which detects the torch therebetween causes the moving controlled object to be automatically retracted, thereby precluding damage to the machine parts.

Still a further object of the invention is to provide an automatic welding apparatus adapted to perform automatic welding while controlling the relative position between the welding torch and a workpiece, wherein three kinds of workpiece-attaching devices are prepared according to the shape of workpieces, said workpiece-attaching devices being adapted to be selectively attached to said automatic welding apparatus.

Briefly described, the present invention comprises a method and system of velocity control for an automatic welding apparatus wherein, in a data processing unit comprising, for example, a microprocessor or a microcomputer, successive interpolation positions between two preset points are computed and the results are given as position instructions to the apparatus; wherein a resultant velocity is set for the three rectangular axes X, Y, Z and a rotative axis $\theta$ for a workpiece; wherein, in the data processing unit, the direction of movement is found on the basis of the information about said two positions in the case of a linear interpolation and said resultant velocity and the direction of movement thus found are used to give instructions for velocity components in the directions of the respective axes, and if the rotation of the workpiece is necessary, the distance from the rotative axis to the welding point is found and instructions are given for a rotative velocity such that the peripheral velocity of the welding point is equal to the preset resultant velocity.

According to a preferred embodiment of the invention, there is provided a method of correcting errors for a position control device, wherein, when said interpolation positions are computed, operations to decimal places are not performed, with the remainder in each operation being taken as an error component, and such remainders are added up until the sum exceeds a given value, whereupon a predetermined value is added or subtracted with respect to the information about the interpolation positions.

According to another preferred embodiment of the invention, there is provided a method of controlling a position control device, wherein, in a data processing unit comprising, for example, a microprocessor or a microcomputer, successive interpolation positions between two points are computed and the results are given as position instructions to the apparatus; and wherein, in said data processing unit, the next interpolation position is computed in response to a clock signal condition or null signal condition from the servo system of the apparatus, the clock signal condition and null signal condition corresponding to what is typically known, to those of ordinary skill in the art of servo systems, as the non-saturated region of the servo system. The result is then given as an instruction, thereby making continuous position control possible without causing any unevenness to the rate of movement.

According to a further preferred embodiment of the invention, there is provided a method of controlling an automatic welding apparatus, wherein, in a data processing unit which comprises, for example, a single chip type microprocessor and in which the weaving pattern of one cycle at the weaving start point and the weaving end point or destination are programmed in connection with said rectangular coordinate system, successive weaving interpolation positions are individually computed for each axis, and the results are given as instructions, whereby said weaving pattern is repeated from said weaving start point to said end point.

Another feature of the invention resides in an automatic welding apparatus, wherein, when there are write instructions (teaching instructions) and welding instructions, step information or velocity information is checked and, if this information is a top step or 50 mm/s, then it is treated as a teaching error.

These and other objects of the invention will become more apparent from the following description given with reference to the accompanying drawings.

BRIEF DESCRIPTION OF THE DRAWINGS:

FIG. 6 is a coordinate position diagram showing the teaching mode of a program;

FIG. 7 is a coordinate position diagram showing the operaton of this embodiment;

FIG. 8 is a graph showing the relation between servo system velocity and position or timing;

FIG. 9 is a detailed flowchart showing a linear interpolation operating mode;

FIG. 25 shows an example of a workpiece suitable for being attached to the workpiece attaching device shown in FIG. 20;

FIG. 26 is a view taken in the direction of arrows VII—VII in FIG. 25;

FIG. 27 shows an example of a workpiece suitable for being attached to the workpiece attaching device shown in FIG. 21;

FIG. 28 is a view taken in the direction of arrows IX—IX in FIG. 27;

FIG. 29 shows an example of a workpiece suitable for being attached to the workpiece attaching device shown in FIG. 22;

FIG. 30 is a sectional view taken in the direction of arrows XI—XI in FIG. 29.

DESCRIPTION OF THE PREFERRED EMBODIMENTS

Figure 1:
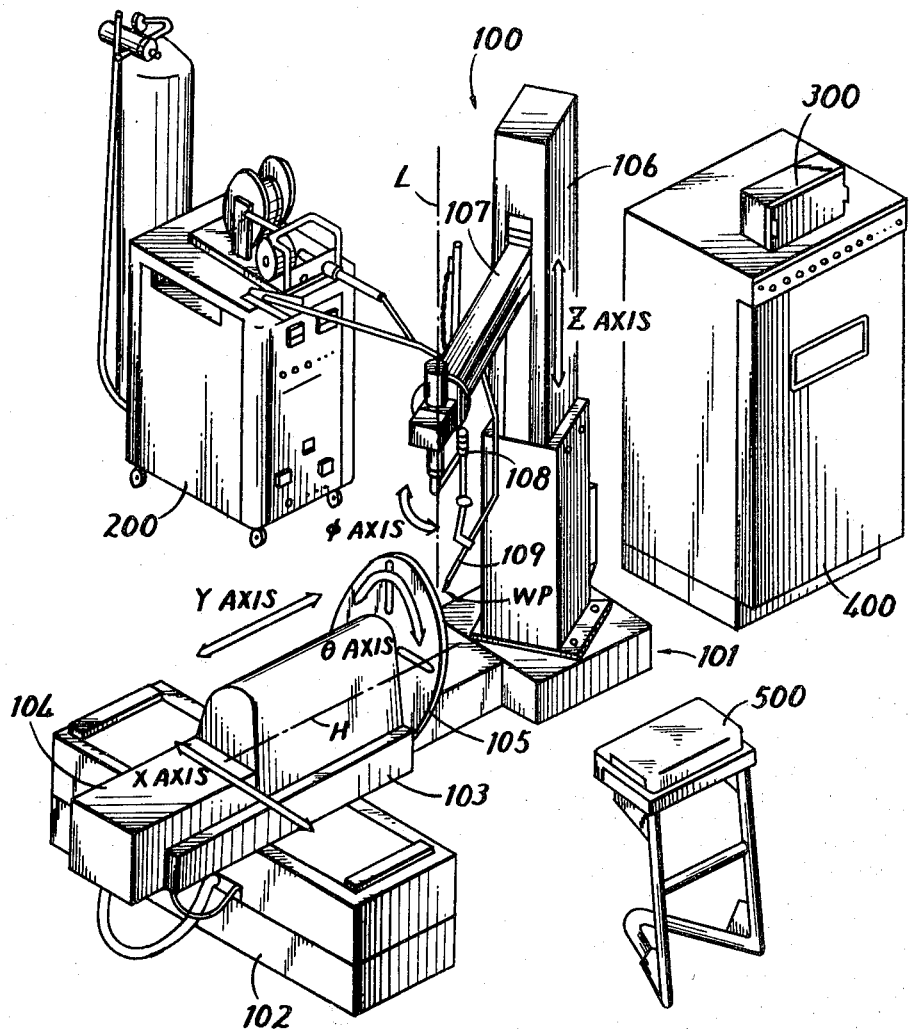
FIG. 1 is a complete perspective view of an automatic welding apparatus according to an embodiment of the present invention.

FIG. 1 is a complete perspective view showing an automatic welding apparatus which forms the background of the invention and to which the invention is applicable. This automatic welding apparatus is arranged in such a manner that the necessary degrees of freedom are divided between a workpiece attaching tool and a welding torch attaching tool so that the position of a workpiece or the welding torch can be controlled. Therefore, even in the case of three-dimensionally welding a workpiece of complicated shape, welding can be performed with an optimum position of the workpiece which provides convenient welding conditions, and the mechanical construction and the control device are also simple.

In the arrangement, this automatic welding apparatus 100 is arranged in such a manner that a tool 105 for attaching a workpiece (not shown) can be moved right and left and back and forth and rotated by an amount $\theta$ of rotation around a horizontal axis H (simply referred as $\theta$ axis) and a tool 108 for attaching a welding torch 109 can be vertically moved and rotated by an amount $\phi$ of rotation around a vertical axis L (simply referred to as $\phi$ axis), there being provided a control box 400 for automatically controlling the movement and rotative position of the workpiece (not shown) and the torch 109.

A base plate 101 which is L-shaped in plan view has a first frame body 102 fixed to one side thereof. Mounted on top of said frame body 102 is a carriage 103 movable right and left (in the direction of the X-axis shown in the figure). Power means (not shown) for said carriage 103 is a known motor equipped with a reduction gear mechanism and a brake, while power transmission means (not shown) for said carriage is ball-and-nut engagement means (so-called ball screw). Further, mounted on top of the carriage 103 is a second frame body 104 movable back and forth (in the direction of the Y-axis shown in the figure). Power means and power transmission means for the frame body 104, though not shown, are a similar motor equipped with a reduction gear mechanism and a brake, and a ball screw.

Provided on the front of said frame body 104 is the workpiece attaching tool 105 rotatable in the $\theta$-axis direction shown in the figure. Power means for this workpiece attaching tool 105, though not shown, is also a known motor equipped with a reduction gear mechanism and a brake.

A third frame body 106 is erected on the other side end of said base plate 101. The third frame body 106 is provided with an arm 107 movable in the vertical direction (the Z-axis direction shown in the figure). Power means and power transmission means for this arm 107, though not shown, are also a similar motor equipped with a reduction gear mechanism and a brake, and a ball screw, respectively. The arm 107 is provided at its front end with the tool 108 for attaching the welding torch 109. Power means for this welding torch attaching means 108, though not shown, is a known motor equipped with a reduction gear mechanism and a brake. Further, the position at which the welding torch 109 is attached is such that a welding point WP on an extension of the center line of said welding torch 109 is aligned with said vertical axis L, while the attaching angle thereof is suitably selected according to the manner of the welding to be performed (such as butt welding or fillet welding) and the shape of the workpiece.

Further, said welding torch 109 is supplied with a current from a welding power source 200. The forward and backward translation and rotation, the rate of movement of said power means (motors each equipped with a reduction gear mechanism and a brake) for the individual parts, and said welding currents are automatically controlled according to a program by said control box 400 and welding control device 300, and the relative position between the two attaching tools 105 and 108 is controlled so that said welding point WP may trace a welding line on a workpiece (not shown) and automatic welding may be performed in a position which provides optimum welding conditions. A remote control panel 500 is provided for manual operation or for preparing a program for that purpose.

In addition, in this embodiment, since the welding point WP on an extension of the center line of the welding torch 109 is adapted to be aligned with the vertical axis L, the welding point remains unchanged irrespective of the rotation of the attaching tool 108 in the $\phi$- axis direction and the attitude of the welding torch 109 with respect to the same welding point can be optionally changed by the rotation of the attaching tool 108 (in the φ-axis direction). That is, the automatic welding apparatus in this embodiment has 5 degrees of freedom, i.e., the amounts X, Y and Z of displacement along the X, Y and Z axes, respectively, and the amounts φ and θ of rotation about the L and H axes, respectively.

Though not shown, the welding control device 300 is provided with voltage regulating means and current regulating means (each comprising a variable resistor, etc.), as is known in the art. Further, in order to provide for changeover between a welding machine proper mode and a welding robot mode, there is provided a robot changeover switch. This switch is normally set for the welding robot mode and operatively associated with the workpiece.

Figure 2:
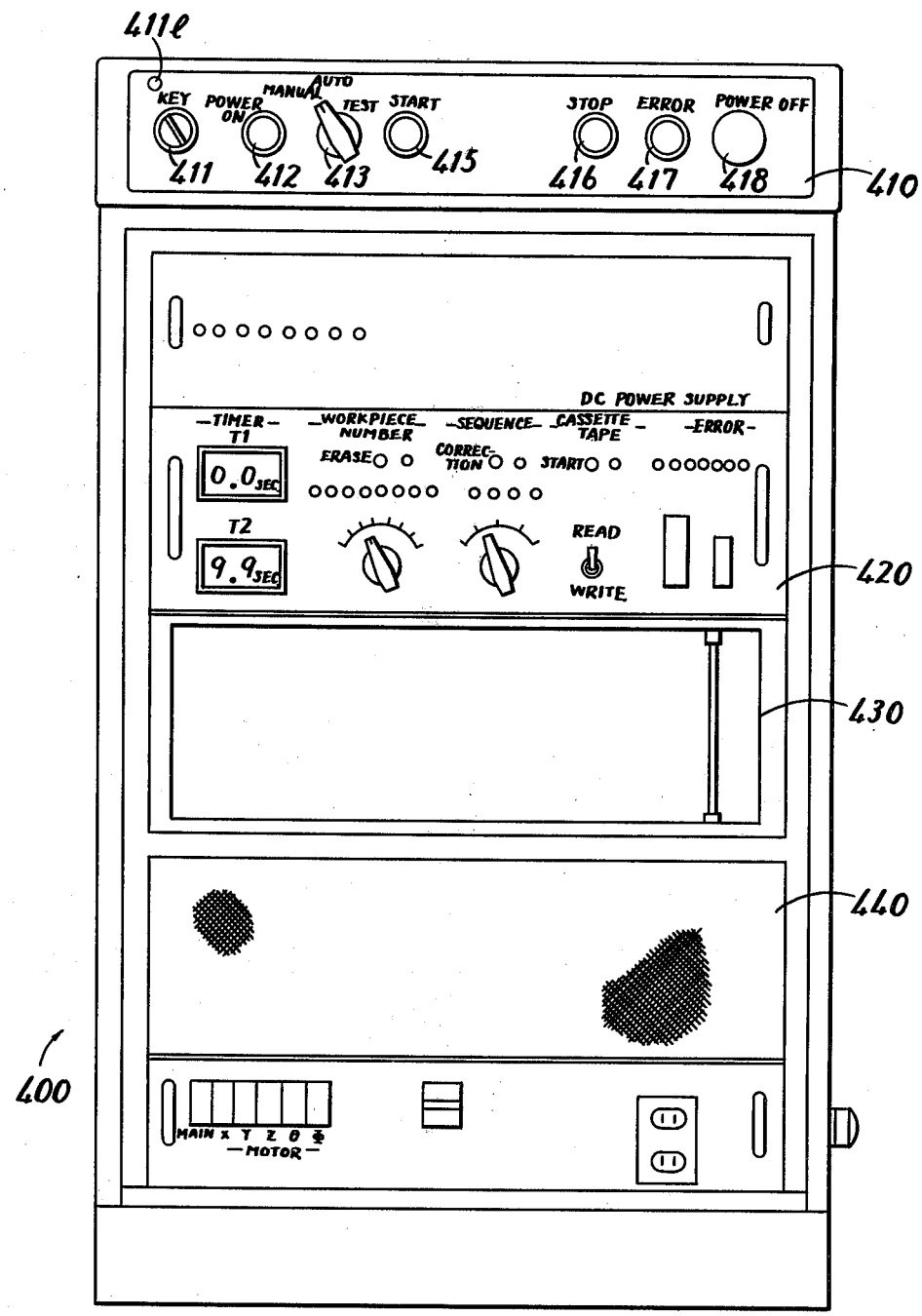
FIG. 2 is a layout view showing a preferred example of a control box 400.

FIG. 2 is a panel layout view showing a preferred example of a control box 400. This control box 400 has a pattern rack 430 for receiving a central processing unit (simply referred to as CPU), such as a microprocessor, and a memory 440 comprising a non-volatile memory, such as wire memory, for giving program instructions to an arithmetic unit, said program being taught to said memory 440. The memory 440 has a memory capacity such that, for example, the number of memorizable workpieces is 8, the number of memorizable steps is 550, and the number of memorizable blocks (into which a single workpiece is divided) is 10 per workpiece. In this embodiment, according to a program taught to the memory 440 in advance, the positioning of the various axes X, Y, Z, θ and φ of the automatic welding apparatus 100 is designated so as to effect the sequence control and velocity control in the directions of the axes X, Y, Z and θ.

Further, the control box 400 is provided with a main panel 410. Disposed on said main panel 410 are a key switch 411 serving as a main switch, a line lamp 411*l*, a power switch 412, a mode selecting switch 413 for selecting manual, automatic and test modes, a start switch 415 to be depressed at the time of starting any of said operating modes, a pause switch 416 to give instructions for a temporary stop or a pause in the case of automatic mode, an error lamp 417 to indicate the occurrence of an error, and a power cutoff switch 418 for emergency stop. The operations and actions of these elements will be more readily understood in connection with a detailed description to be given later.

Figure 3:
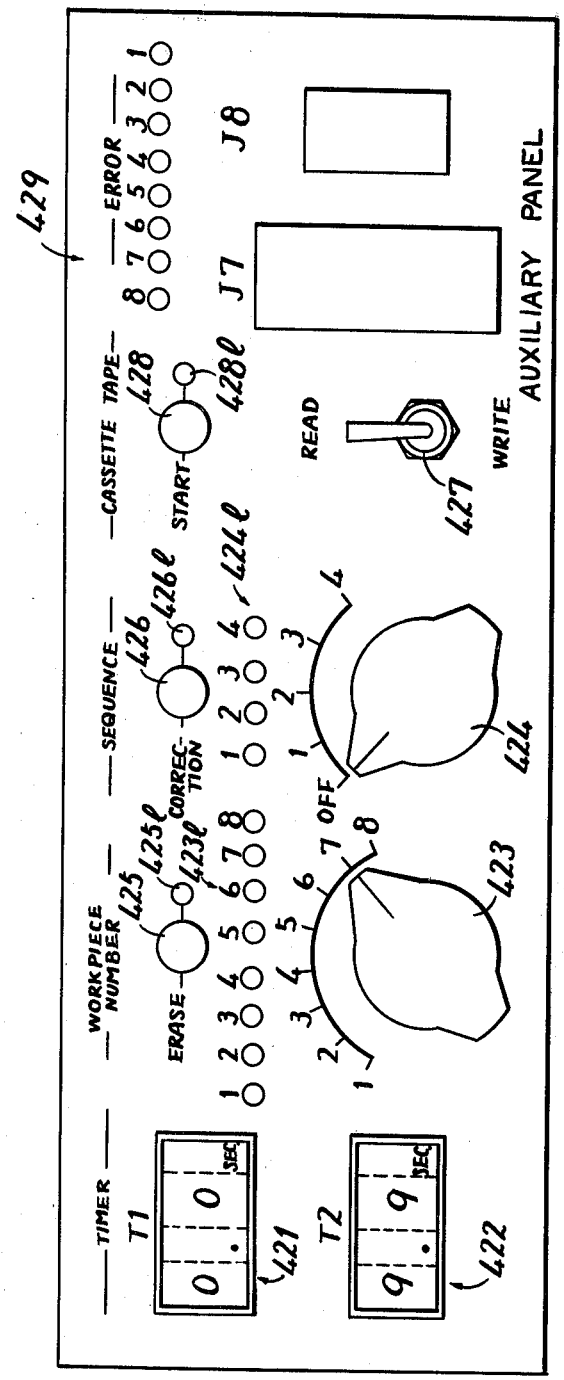
FIG. 3 is a layout view showing a preferred example of an auxiliary panel 420.

Further, the control box 400 is provided with an auxiliary panel 420, the details of which are shown in FIG. 3. The auxiliary panel 420 is provided with digital switches 421 and 422 for setting two timers to respective predetermined times necessary for the above described various operating modes. These switches 421 and 422 are capable of being set up to 9.9 seconds in increments of 1/10 second.

The auxiliary panel 420 is also provided with a workpiece selecting switch 423 for selecting 8 kinds of workpieces and a workpiece protection lamps 423*l* for indicating already registered workpieces. The workpiece protection lamps 423*l* are arranged so that, when even one word is written in connection with any one of the workpieces, the lamp which corresponds to that workpiece number will light up and that, reversely, when a workpiece number erasing action is executed by a workpiece number erasing switch 425 (and workpiece selecting switch 423), the lamp associated with the number in question will be put out.

A sequence selection switch 424 is used to select sequences "1", "2", "3", "4" (which indicate the interlocking with the outside equipment), such selected sequence numbers being indicated by sequence lamps 424*l*. There is provided a sequence correcting switch 426 (and associated lamp 426*l*). The sequence correcting switch 426 is used in connection with the manual or test mode for changing the programed conditions. Further, disposed on the auxiliary panel 420 are a read-write switch 427 for switching between the reading of data from a magnetic tape (MT) to the memory 440 and the writing of data from said memory 440 to such magnetic tape, a start switch 428 (and associated lamp 428*l*) for starting the magnetic tape, and error code lamps 429 for reporting the contents of an error when such error occurs. The operations and actions of these elements will be readily understood in connection with a detailed description to be given later.

Figure 4:
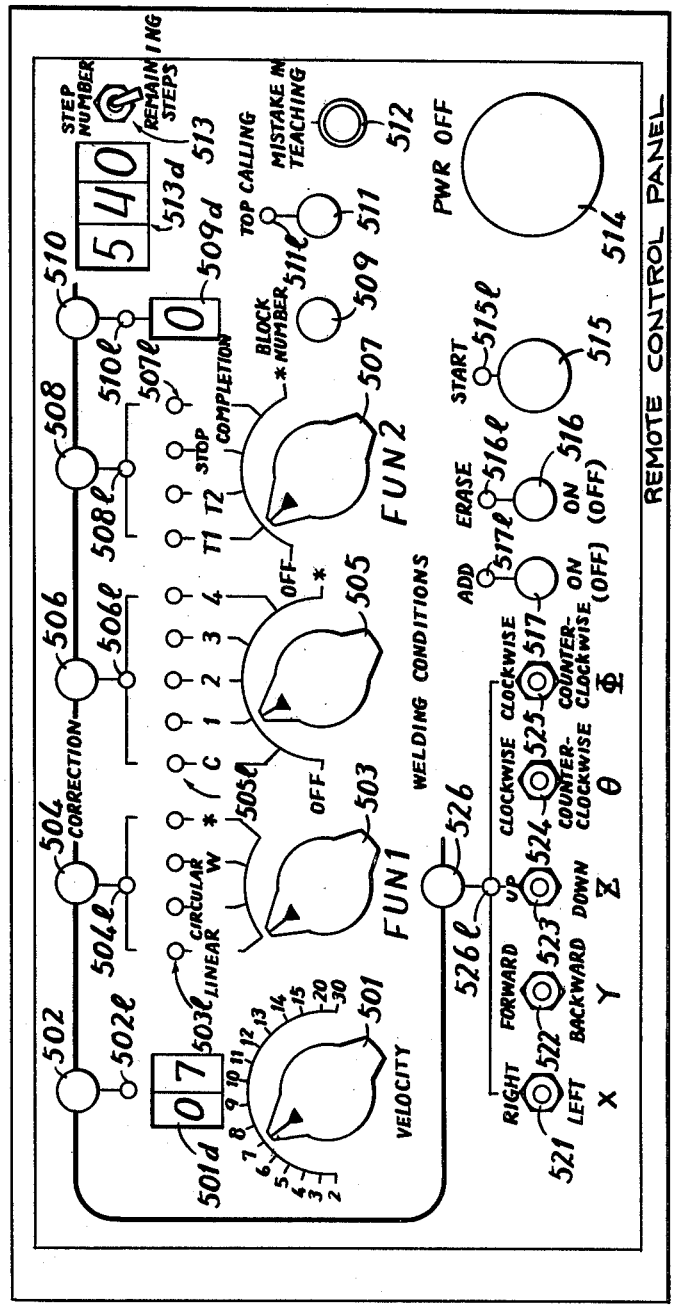
FIG. 4 is a layout view showing a preferred example of a remote control panel 500.

FIG. 4 is a front layout view of the remote control panel 500. The remote control panel 500 is used to remotely control said automatic welding apparatus 100 or to teach a program to said memory 440. Disposed on the panel 500 are a velocity selecting switch 501 for selecting a system velocity (resultant velocity) when a program is played back, a velocity indicator 501*d*, and a velocity correcting switch 502 (and associated lamp 520*l*). Also disposed thereon are a function selecting switch 503 for selecting a linear motion, a circular interpolation or weaving in the automatic welding apparatus 100, function indicating lamps 503*l*, a function correcting switch 504 (and associated lamp 504*l*); and a welding condition selecting switch 505 for selecting welding conditions "C", "1", "2", "3", "4", associated lamps 505*l*, and a welding condition correcting switch 506 (and associated lamp 506*l*). Further disposed on the remote control panel 500 are a function selecting switch 507 for selecting the timers T1, T2 on said auxiliary panel 420, stoppage (a pause in the automatic mode) or termination (end of a program), associated lamps 507*l*, and a function correcting switch 508 (and associated lamp 508*l*).

A block number selecting switch 509 is used for dividing a single workpiece into blocks, as described above, and there are also provided a block number indicator 509*d* and a block number correcting switch 510 (and associated lamp 510*l*). A top calling switch 511 (and associated lamp 511*l*) is used to designate the start mark when writing a program at the time of manual mode and also to designate the leading step for a workpiece (or block) programmed at the time of automatic or test mode, and is adapted to be automatically set when the power is turned on. The remote control panel 500 is further provided with a step changeover indication switch 513 and an indicator 513*d* for selectively indicating what workpiece number the current step corresponds to (i.e., step number) or how many steps which can be written in the memory 440 are left (i.e., the number of remaining steps). A teaching mistake lamp 512 will light up when an error occurs during the teaching operation, so as to indicate the occurrence of such error.

Further disposed on the remote control panel 500 are an X-axis manual switch 521, a Y-axis manual switch 522, a Z-axis manual switch 523, a θ-axis manual switch 524, and a φ-axis manual switch 525, for manually operating said axes X, Y, Z, θ and φ, respectively. Further disposed thereon are an adding switch 517 (and associated lamp 517*l*) and an erasing switch 516 (and associated lamp 516l) which cooperate with said switches 521-525 to add a step at the time of test mode and erase unnecessary steps one by one at the time of test mode, respectively, and a position correcting switch 526 (and associated lamp 526l) for positional correction at the time of test mode or manual mode. A start switch 515 (and associated lamp 515l) and a power cutoff switch 514 are the same as those provided on the main panel 410 of said control box 400. While an outline of the arrangement has been given so far, the detailed operation thereof will now be described below.

Figure 5:
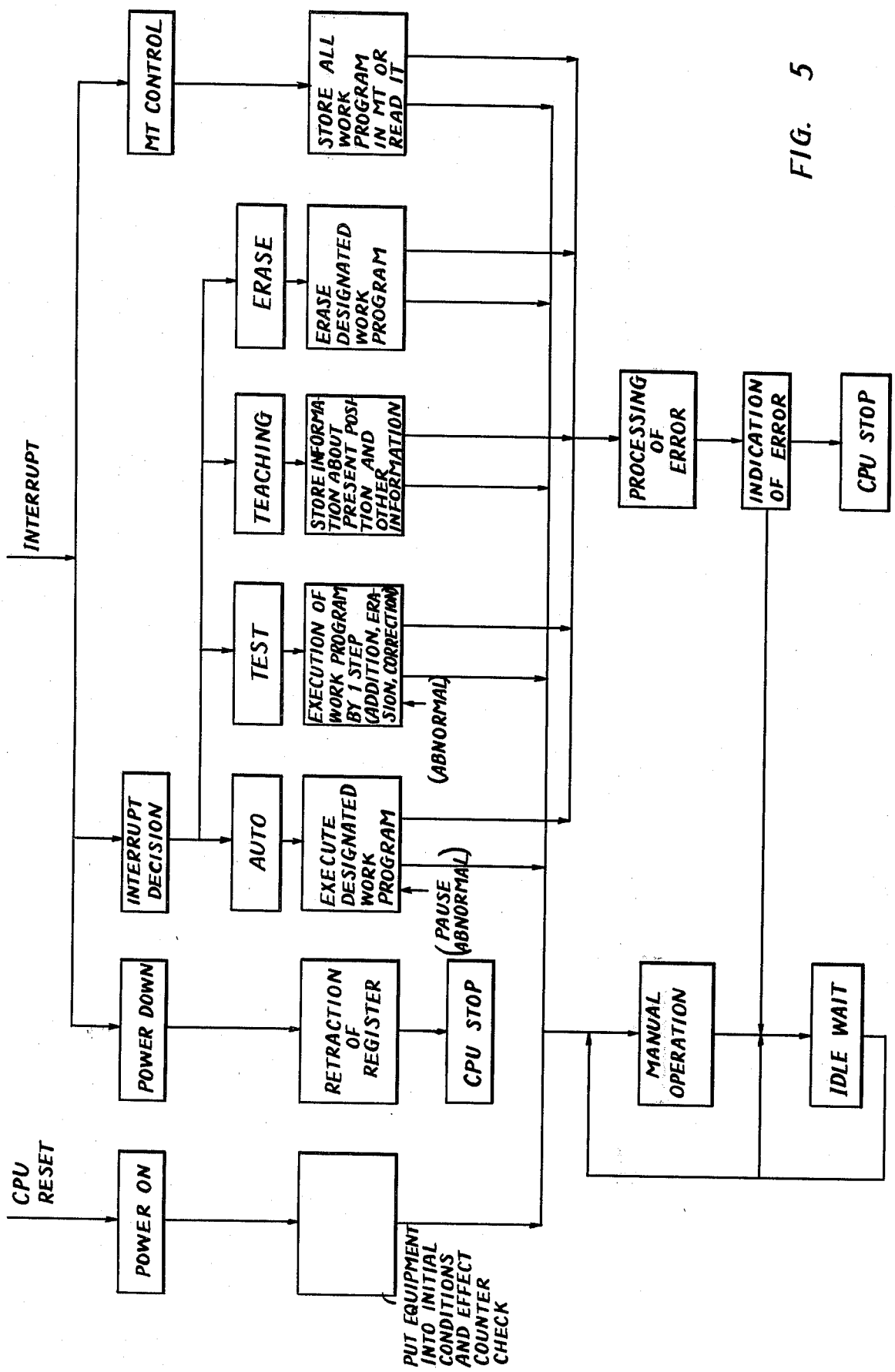
FIG. 5 is a flowchart showing the outline of the operation of this embodiment.

In operation, first of all, referring to the flow chart of FIG. 5, preparation for running (that is, preparation for performing a manual mode, teaching mode, test mode or automatic mode to be described later) will be described. First, the power switch 412 is turned on to energize the control box 400 and remote control panel 500. Then, if there is nothing wrong with the equipment, operation is allowed. To this end, counter check within the CPU is performed. That is, the information about the various axis positions in the apparatus obtained by, for example, a potentiometer is turned to the conditions inside the CPU (the contents of the counter when a null signal is produced in connection with making a count for each axis). Thereby, the respective lamps and indicators indicate the conditions of the corresponding switches and the top calling switch 511 on the remote control panel 500 is turned on to light the lamp 511l, while in the indicator 513d, the number of program steps (PSCS) at this time is (O), with the number of remaining steps (PSX) being indicated as such. Further, the block number indicator 509 on the remote control panel indicates (O) and those of the workpiece number indicating lamps 423l on the auxiliary panel 420 which correspond to the workpieces which have been registered are lighted for indication. Preparation for running is made in this way, but if there is something wrong with the equipment, the error lamp 417 on the main panel 410 will be lighted and the contents of such error will be indicated by the error code lamps 429. These error code lamps 429 are, for example, eight in numbers, and these lamps are turned on to represent "1" and turned off to represent "0" to provide, for example, a three-digit numerical code for indication. Such error codes are predetermined according to the contents of errors produced in the equipment.

The manual operation will now be described. The manual operation is used mainly in connection with the teaching mode to be described later, in order to check on the lamps and indicators and known the conditions of the equipment. In this case, first, the mode selecting switch 413 on the main panel 410 is set to MANUAL OPERATION. The indicator lamps and indicators on the remote control panel 500 then show the indications by and conditions of the corresponding switches. Subsequently, instructions for suitable velocities (along the individual axes) are given. And, manual (toggle) switches 521, 522, 523, 524 and 525 for the rspective axes X, Y, Z, $\theta$ and $\phi$ on the remote control panel 500 are tilted from their neutral positions to provide desired directions (right and left, and clockwise and counterclockwise). As a result, the individual axis positioning devices for said automatic welding apparatus 100, that is, the carriage 103, second frame body 104, arm 107, workpiece attaching tool 105 and torch attaching tool 108 are moved at said preset velocities in said desired directions during the whole time said axis manual switches 521-525 are being manipulated. in this way, the axis position control, that is, the control of the relative position between the workpiece and the torch can be achieved by the manual operation.

TEACHING MODE

This is a mode for positioning the individual axes in the manual operation (described above) by the remote control panel 500 and writing a program in the memory 440 by selecting (setting) velocity and welding conditions. In this case, first of all, a manual operating mode is set by the mode selecting switch 413 on the control box 400. Therefore, manual operation in each axis becomes possible. Subsequently, an unused workpiece number is designated by using the workpiece selecting switch 423 on the auxiliary panel 420. As a result, the corresponding workpiece protection lamp 424l is lighted to indicate the selected workpiece number. And, top calling switch 511 is turned on to light the lamp 511l and select a block number (if any).

Thereafter, by the manual operation described above, each axis is manually positioned, and a system velocity (resultant velocity) is selected by the velocity selecting switch 501; linear, circular or arcuate weaving is selected by the function selection switch 503; welding conditions ("C", and "1" through "4") are selected by the welding condition selecting switch 505; timer T1, T2, stoppage or termination is selected by the function selecting switch 507, and a sequence is selected by the sequence selecting switch 424.

Subsequently, the start switch 415 or 515 is turned on. If there is an error in the above setting of the equipment (such as velocity instruction error or the absence of instructions for 3 points or a multiple of 3 points in the case of a circular interpolation), then the error lamp 417 is lighted and the contents of said error are indicated by the error code lamps 429, and the conditions in this case are prevented from being written in the memory 440. If there is no error, the present conditions of the equipment as controlled by said manual operation are written at a predetermined address. And, a manual operation is allowed again. At the same time, in the interior of the CPU, the present step number "PSCS" for the workpiece under consideration has "+1" added thereto and the remaining step number "PSX" has "−1" added thereto and the result is indicated by the indicator 513d while the corresponding workpiece protection lamp 511l is turned off.

Thereafter, similar operations are repeated for writing in the memory 440.

Now, referring to FIGS. 6A-6E, the teaching of a linear interpolation, the teaching of a circular or arcuate interpolation, or the teaching of weaving will be described.

Figure 6A:
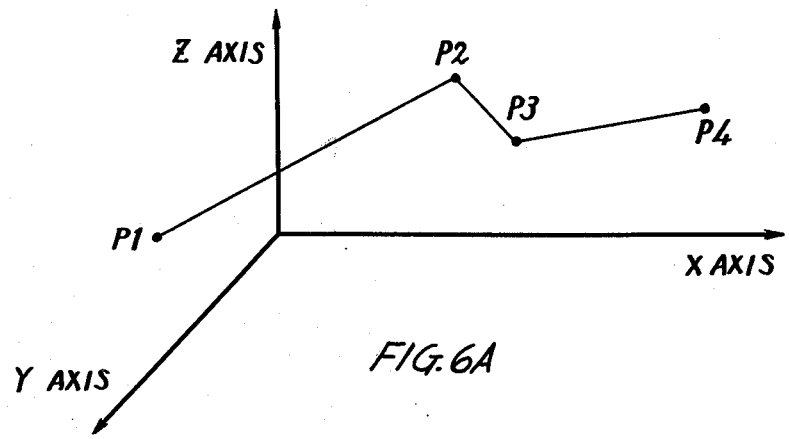
FIGS. 6A, 6B and 6C show a linear interpolation, a circular or arcuate interpolation, and a weaving interpolation, respectively.

First, a linear case shown in FIG. 6A will be described with continued reference to FIGS. 1-4, as necessary. In this case, the mode "LINEAR" is selected by the function selecting switch 503 on the remote control panel 500, and is set. Then, positioning to successive points P1, P2, P3 and P4 is effected by a manual operation (this being also applicable to an arcuate case and a weaving case which follow), and at each point, various conditions are set by the velocity selecting switch 501, function selecting switch 503, welding condition selecting switch 505, and function selecting switch 507. Position information and individual condition information are written in the memory 440 at each step, thereby completing a program. The aforesaid condition information including velocities and welding conditions in each step interval (points P1-P2, P2-P3, etc.) will be indicated at later steps (P2, P3, etc.), and when teaching is effected as shown in FIG. 6A, position control will be effected in the case of an automatic operating mode to be described later in such a manner that the X, Y and Z axes are aligned with the points P1-P2-P3-P4.

Figure 6B:
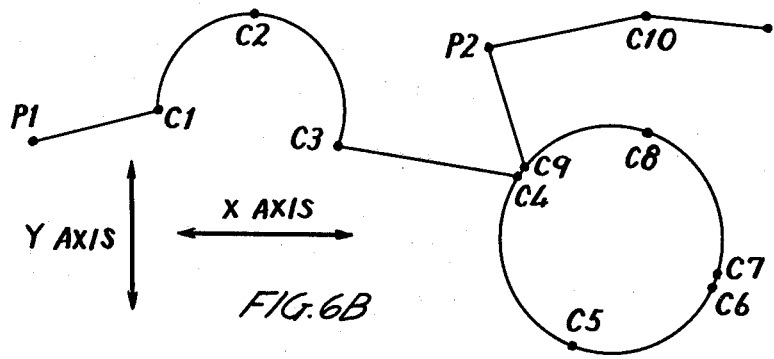

A circular case shown in FIG. 6B will be described. In this case, from points P1 to C1 extends a straight line, and from points C1 to C3, from C4 to C6 and from C7 to C9 extends a circle (or arc), respectively. In the teaching of such arc, at least 3 steps (6 steps for a circle) are required, and if this requirement fails to be met, this results in a teaching error. In addition, indications of welding conditions, velocity, sequence and function are made at the third step of an arc (points C3, C6, C9) and at the second step (C2, C5, C8) these indications are neglected. And, in the case of an arc, the $\theta$-axis direction is not moved at the second and third steps, and the $\phi$-axis is directed so that it is at right angles to the arc as much as possible.

Figure 6C:
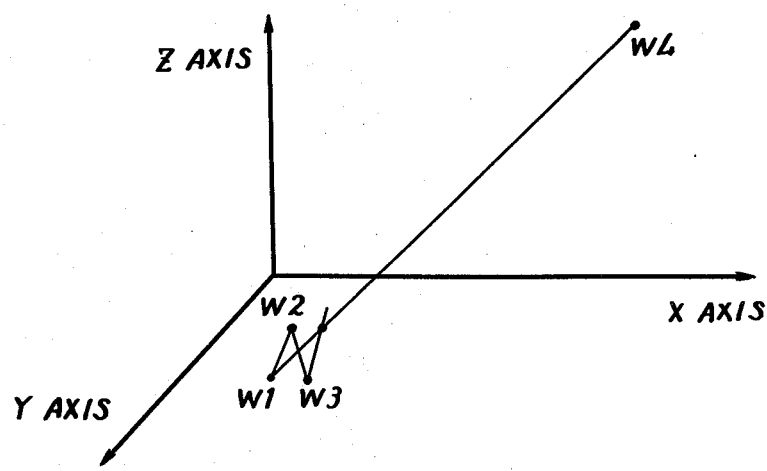

Finally, a weaving case shown in FIG. 6C will be described. In this case, the mode "WEAVING" is selected by the function selecting switch 503 on the remote control panel 500, and is set. In this weaving, one cycle (points W1, W2, W3) and the destination or terminal point (W4) are taught. In addition, instructions for velocity and welding conditions are given at each step. Further, X, Y, Z and $\theta$ axes move toward the terminal point while repeating weaving, but the $\phi$ axis only repeats the same position. In this way, teaching is effected in linear, circular or arcuate and weaving cases, thereby completing a program. When it is desired to correct the written information, the correction switch is depressed and then by depressing the start switch, even a manual mode can be corrected. That is, only the function for which the correction switch is depressed is corrected.

Various teaching errors produced in program teaching in the automatic welding apparatus 100 shown in FIG. 1 may be thought, and such errors can be specified by two-digit numerical codes. Typical of them are those errors which occur when the top step is attended with welding instructions (code 09) or when the welding velocity is not proper (code 10). That is, the top step is a step for indicating the initial position for automatic welding to be subsequently indicated. In such top step, therefore, there cannot be and there should not be any welding instructions. Further, as for preset velocity, it is set to 2 mm/s-20 mm/s when executing welding or to 50 mm/s when effecting only a movement without actual welding. Therefore, when there are welding instructions, the preset velocity cannot be and should not be 50 mm/s. Preferred embodiments intended to check on such teaching errors will be described with reference to FIGS. 6D and 6E.

FIG. 6A is a flowchart showing an embodiment of the invention. As described above, in the case of teaching, positioning is effected in the directions of the axes X, Y, Z, $\theta$ and $\phi$, and a resultant velocity is set. Subsequently, in response to the start switch 512 being turned on, an error check shown in FIG. 6A is made in a control circuit comprising, for example, a single chip type microcomputer or a general-purpose computer.

If the start switch 512 is depressed, that is, if there are write instructions, then it is decided whether or not there are welding instructions (block 652). If the answer is "NO", that is, if the welding condition switch 505 is at "C", then the various axis positions are written (block 654) in the memory 440 (FIG. 2). On the other hand, if it is "YES", that is, if the welding conditions are at "1"-"4", then it is decided whether or not the step at this time is the top step (block 656). If the answer is "NO", said positions are written (block 654) in said memory 440. If it is "YES", this is a teaching error, and the error lamp 417 in FIG. 2 and the teaching error lamp 506 in FIG. 4 are lighted (block 658) while the error code indicator 421 in FIG. 2 indicates the code "09". Besides this, it is advisable not to write said various axis positions in the memory 440 when such teaching error occurs.

Figure 6D:
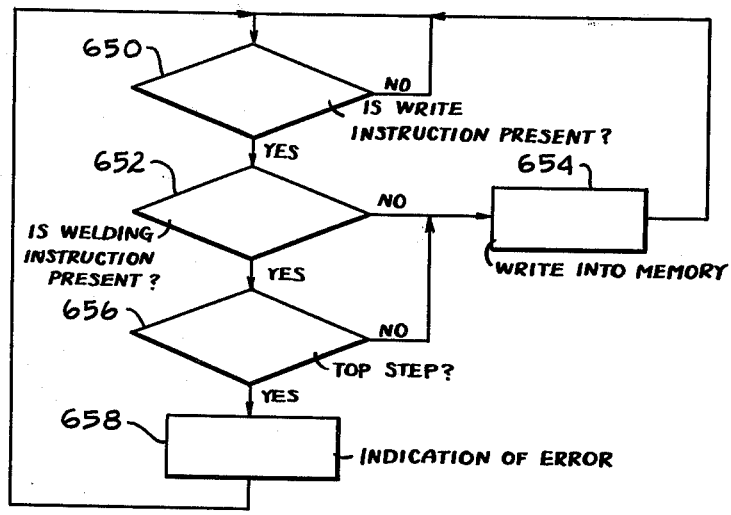
FIGS. 6D and 6E are flowcharts each showing an embodiment of the invention.
Figure 6E:
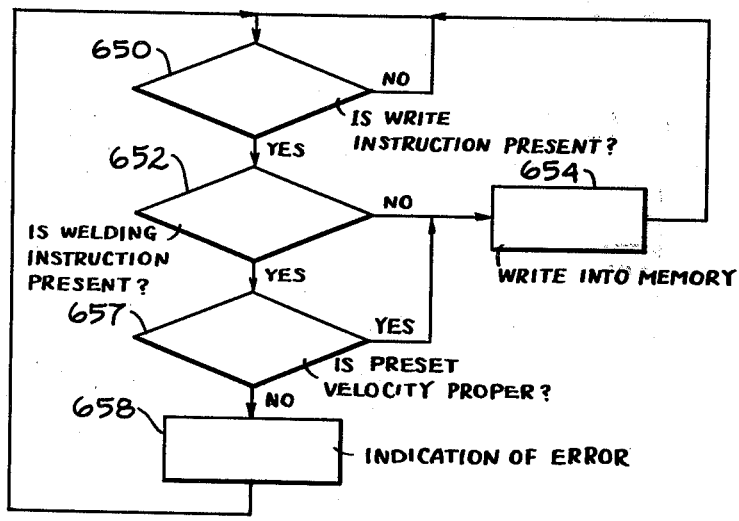

FIG. 6E is a flowchart showing another embodiment of the invention. As described above, if the start switch 512 is depressed, that is, if there are write instructions (block 658), then it is decided whether or not there are welding instructions (block 652). If the answer is "NO", that is, if the welding condition switch 505 is at "C", then said various axis positions are written (block 654) in the memory 440 (FIG. 2). If it is "YES", that is, if the welding conditions are at "1"-"4", then it is decided (block 657) whether or not the preset velocity at this time is proper (20 mm/s or below). If the answer is "YES", said positions are written (block 654) in said memory 440. If it is "NO", this is a teaching error, and the error lamp 417 in FIG. 2 and the teaching mistake lamp 506 in FIG. 4 are lighted while the error code indicator 421 in FIG. 3 indicates the code "10" (block 658). Besides this, it is advisable not to write said various axis positions in the memory 440 when such teaching error occurs.

As described above, according to this embodiment, a safe automatic welding apparatus is obtained which is capable of precluding teaching errors (mistakes), having no possibility of causing malfunctions.

TEST MODE

In this mode, the automatic welding program prepared in the above described teaching mode is executed step by step to ascertain the actions of the welding apparatus 100 and make corrections, additions or erasures. At this time, first, the "TEST" mode is selected by the mode selecting switch 413 provided on the main panel 410 of the control box 400 and is set. Subsequently, the workpiece number which it is desired to test is selected by the workpiece selecting switch 423 on the auxiliary panel 420 and is set, and the block number is selected by the block selecting switch 509. The top calling switch 511 is then turned on to call out the top (leading) step for the workpiece in question having the workpiece number in question. Thereafter, the start switches 415 and 515 are turned on.

At this point, if there is an error in the setting of the equipment, the error lamp 417 is lighted and the contents of such error are indicated by the error code lamps 429. Further, if there is no such error, the present step number "PSCS" in the CPU has "+1" added thereto and the velocity in that step, the mode (linear, the arcuate or weaving), welding conditions, the function, (T1, T2, stoppage or termination), and the sequence are indicated by the corresponding indicators 501d, lamp 503l, lamp 505l, lamp 507l and lamp 424l, respectively. The individual axis positioning devices of the automatic welding apparatus 100 move in each step in the mode selected by function selecting switch 503.

Further, when it is necessary to effect the correction, addition or erasure of the program, the correction switches 502, 504, 506, 508, 510 and 526 on the remote control panel 500 are depressed for program correction, the adding switch 517 is depressed for program addition, or the erasing switch 516 is depressed for program erasure. That is, when the correction switches 502, 504, ..., 510 are depressed, the corresponding selection switches 501, 503, ..., 509 become effective, and when the correction switch 526 is depressed, the axis manual switches 521-525 become effective, thus making correction possible. A similar situation is brought about when the switch 426 on the auxiliary panel is depressed. At this time, the step to be corrected is the present step, but so far as positional control is concerned, those steps which are continuous and have the same position information will be corrected until a different step appears. And, the present step number "PSCS" indicated by the indicator 513d remains unchanged. Further, when the adding switch 517 is depressed, a manual operation similar to the one described above is allowed. In addition, a step which is added at this time is programed just before the present step, and although the present step number indicated by the indicator 513d remains unchanged, the remaining step number "PSX" has "−1" added thereto. Further, when the erasing switch 516 is depressed, the step at this time is erased from the memory 440 and hence the present step number has "−1" added thereto while the remaining step number has "+1" added thereto.

The start switches 415 and 515 are turned on again to repeat the test and check on the program. At this time, if the mode selected by the function switch 503 is linear, then linear interpolations are made with respect to the X, Y and Z axes from the present step to the next step, and rotation is effected in the directions of the $\theta$ and $\phi$ axes. Further, if it is weaving, then the weaving pattern (cycle) is not repeated and instead a linear movement is effected in each step according to the teaching.

AUTOMATIC OPERATION MODE

In this mode, a program which has been taught and which has its actions ascertained to be correct by the test as described above is executed to carry out welding. In this case, first of all, the automatic welding apparatus 100 is prepared for running, and a changeover switch (not shown) provided on the welding control device 300 is set to welding robot. Along with this, the mode selecting switch 413 on the main panel 410 is set to "AUTO". Then, a desired workpiece number is selected by the workpiece selecting switch 423 and the workpiece corresponding to said workpiece number is fixedly secured to the workpiece attaching tool 105 of the apparatus 100. Thereafter, the welding power source 200 is turned on to apply power to the welding apparatus 100. Further, the top calling switch 522 is turned on and a block is selected by the block selecting switch 509. Thereafter, the start switches 415 and 515 are depressed.

Thereafter, the X, Y, Z, $\theta$ and $\phi$ axis positioning devices (that is carriage 103, second frame 104, third frame body 106, workpiece attaching tool 105 and torch attaching tool 108) execute the specified work program to complete the welding. Now, if there is an error in the setting of the equipment or an accident happens during the welding, the error lamp 417 is lighted and the contents thereof are indicated by the error code lamps 429. Further, when the program is progressively executed, it goes without saying that the remote control panel 500 indicates the conditions of the successive steps. In addition, by turning the stop switch 416 on or by teaching "stop" in advance by the function selecting switch 507, it is possible to put a temporary stop (pause) to the execution of the program to interrupt the same after the completion of that step. If the welding power source 200 is not turned on, automatic operation is possible without actually performing welding. While the arrangements and operations of embodiments which form the background of the invention have so far been described in brief, a linear interpolation, arcuate interpolation and weaving interpolation in the automatic operating mode which are characteristic of the invention will now be described.

Figure 7A:
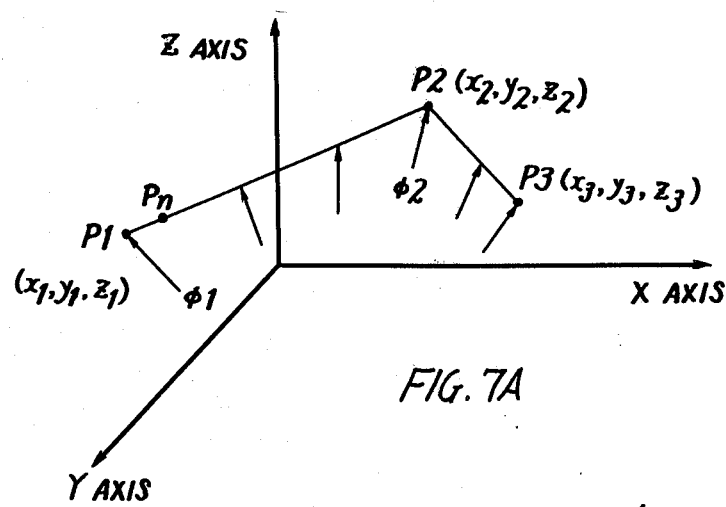
FIGS. 7A, 7B and 7C are coordinate position diagrams showing the operation of this embodiment in a linear interpolation operating mode, an arcuate interpolation operation mode, and a weaving interpolation operating mode, respectively.

FIG. 7A shows the coordinates of points which explain the operation in a linear interpolation, and FIG. 9 is a flowchart showing the subroutine defining the operation thereof. First of all, a "linear interpolation" mode will be described with reference to FIGS. 7A and 9. In this mode, the CPU controls the torch 109 of the automatic welding apparatus 100 so that is may be linearly moved between two indicated points while interpolating the distance therebetween.

As a condition for correctly performing welding, it is required that the path and velocity be accurate. Now, in the case of a movement from a point P1 ($x_1$, $y_1$, $z_1$) to a point P2 ($x_2$, $y_2$, $z_2$), if the rates of movement in the individual directions (velocity components) and the position of said point P2 are indicated, then the movement will be made at the resultant velocity V in a straight line.

Figure 10:
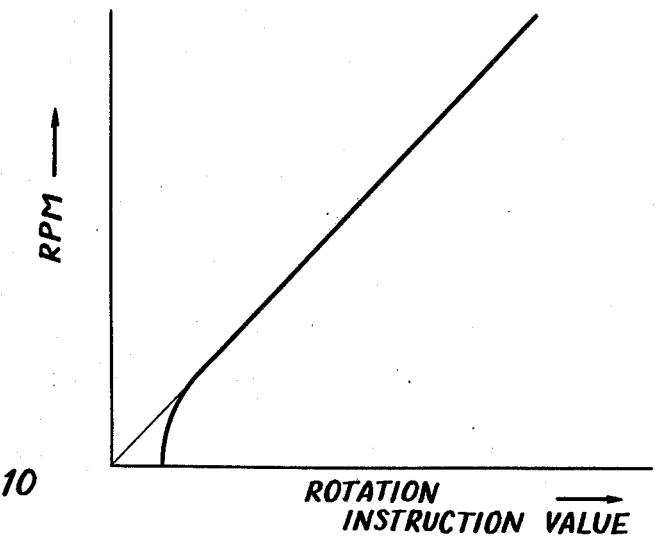
FIG. 10 is a graph showing the drooping characteristic of a dc motor used as power means.
Figure 11:
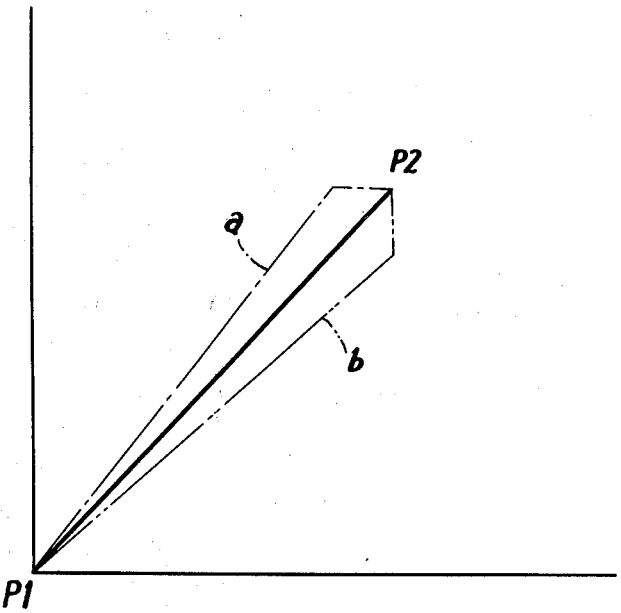
FIG. 11 is a graph showing velocity errors for explanation of the necessity of interpolation.

However, when the power means (such as dc motors in this embodiment are used, so long as a constant torque is obtained there will be no problem even if the speed is low. But a heavy load will result in a drooping characteristic, as shown in FIG. 10. At this rate, therefore, one axis or another would reach the intended position earlier than the others, as shown in FIG. 11, so that the position would become incorrect as the path is shown at a in a dash-dot line or at b in a dash-double-dot line. It is possible to obtain the correct path and velocity by finely dividing (or interpolating) the distance between said points P1 and P2. In this way, in order to compensate for the drooping characteristic of the power means such as dc motors, the interpolating function becomes necessary.

First, the CPU decides that the movement between the two indicated points should be by a linear interpolation (block 800), and a welding sequence signal is given to the automatic welding apparatus 100 (block 802). Then, velocities $V_x$, $V_y$, $V_z$ and $V_\theta$ for the respective axis X, Y, Z and $\theta$ are computed (block 804) by reading the velocity V indicated by the velocity selecting switch 501 and the programmed coordinates from the memory 440. That is, the velocities $V_x$, $V_y$, $V_z$, and $V_\theta$ in the directions of the X, Y, Z and $\theta$ axes, respectively, are given by the following equations (1), (2), (3) and (4), respectively.

$$V_x = \frac{V \cdot (x_2 - x_1)}{\sqrt{(x_2 - x_1)^2 + (y_2 - y_1)^2 + (z_2 - z_1)^2}} \quad (1)$$

$$V_y = \frac{V \cdot (y_2 - y_1)}{\sqrt{(x_2 - x_1)^2 + (y_2 - y_1)^2 + (z_2 - z_1)^2}} \quad (2)$$

$$V_z = \frac{V \cdot (z_2 - z_1)}{\sqrt{(x_2 - x_1)^2 + (y_2 - y_1)^2 + (z_2 - z_1)^2}} \quad (3)$$

$$V_\theta = \frac{V \cdot K}{\sqrt{(x - 2048)^2 + (z - 2048)^2}} \quad (4)$$

where $x_1$ and $x_2$ are X-coordinates; $y_1$ and $y_2$ are Y-coordinates; $z_1$ and $z_2$ are Z-coordinates; and K is a coefficient. In this connection, since the center position of the workpiece attaching tool 105 is set so that it is at the intersection between the center position of the X axis and the center position of the Z axis, the rotative velocity $V_{74}$ in the $\theta$ axis direction can be obtained by finding the distances from the center of the $\theta$ axis (the center 4096/2 of 4096 bits) to any points x and z on the X and Z axes, and hence it is as expressed by the equation (4). In addition, the coefficient K is the gear ratio, etc., from the power means to the workpiece attaching tool 105. In this way, the velocities in the directions of the X, Y, Z and $\theta$ axes ($\phi$ being unnecessary) can be obtained. The numerical value 2048 representing the center in the above equation (4) is not necessarily limited to this numerical value.

Subsequently, in the CPU, the lengths (pitches) to the next interpolation points in the directions of the X, Y, Z and $\theta$ axes will be found. However, as for the $\phi$ axis, in order to control the torch 109 so that its tip is always at an optimum angle with the welding line, it is determined on the principle of proportional distribution with respect to the total number of interpolations (length/pitch=N). That is, the pitches $D_x$, $D_y$, $D_z$ and $D_\theta$ in the directions of the X, Y, Z and $\phi$ axes are given by the following equations (5), (6), (7) and (8), respectively (are block 806). In addition, the remainders $DD_x$, $DD_y$, $DD_z$ and $DD_\phi$ found in these pitch computations (constituting errors; they are produced because the computations are based on the fixed point and are discarded) are obtained at the same time (see again block 806).

$$D_x = \frac{D \cdot (x_2 - x_1)}{\sqrt{(x_2 - x_1)^2 + (y_2 - y_1)^2 + (z_2 - z_1)^2}} \ldots DD_x \quad (5)$$

$$D_y = \frac{D \cdot (y_2 - y_1)}{\sqrt{(x_2 - x_1)^2 + (y_2 - y_1)^2 + (z_2 - z_1)^2}} \ldots DD_y \quad (6)$$

$$D_z = \frac{D \cdot (z_2 - z_1)}{\sqrt{(x_2 - x_1)^2 + (y_2 - y_1)^2 + (z_2 - z_1)^2}} \ldots DD_z \quad (7)$$

$$D_\phi = \phi_2 - \phi_1/N \ldots DD_\phi \quad (8)$$

where D is the interpolation pitch and $\phi_1$ and $\phi_2$ are the angles at which the torch tip is disposed at points $P_1$ and $P_2$. In this way, one pitch and an error component in each of the directions of the axes X, Y, Z and $\phi$ are obtained.

Thereafter, in the CPU, the positions $X_n$, $y_n$, $z_n$ and $\phi_n$ of the next point to be interpolated are found (block 808). They can be obtained by adding said axis pitches $D_x$, $D_y$, $D_z$ and $D_\phi$ to the initial positions (in this case, $x_1, y_1, z_1$ and $\phi_1$) on the axes in the coordinate system. That is, they are obtained as the X-coordinate $x_n = x_{n-1} + D_x$, Y-coordinate $y_n = y_{n-1} + D_y$, Z-coordinate $z_n = z_{n-1} + D_z$ and $\phi$-coordinate $\phi_n = \phi_{n-1} + D_\phi$ of the next interpolation point.

At this time, in the CPU, error corrections of said $x_n$, $y_n$, $z_n$ and $\phi_n$ are made on the basis of said axis error components ($DD_x$, $DD_y$, $DD_z$ and $DD_\phi$) (block 810). That is, the errors obtained in each pitch computation are successively added up and when the sums ($DD_xS$, $DD_yS$, $DD_zS$ and $DD_\phi S$) exceed predetermined values, corrections are made. This will be described with reference to, for example, the X axis. First, $DD_xS_n = DD_xS_{n-1} + DD_x$ is found and, if this $DD_xS_n$ is such that $$\frac{DD_xS_n}{\sqrt{(x_2 - x_1)^2 + (y_2 - y_1)^2 + (z_2 - z_1)^2}} \geqq \pm 1 \text{ (indicating bits)},$$

then a correction is made with said interpolation position taken as $x_n = x_n + 1$. Then, $$DD_xS_n = DD_xS_n \mp \sqrt{(x_2 - x_1)^2 + (y_2 - y_1)^2 + (z_2 - z_1)^2}$$

Similarly, $DD_yS_n$ and $DD_zS_n$ are found with respect to the Y and Z axes, and similar decisions and corrections are made. Further, as for the $\phi$ axis, $DD_\phi S_n(DD_\phi S + DD_\phi)$ is found and if $DD_\phi S_n/N \geqq \pm 1$, then, $\pm 1$ is added to said interpolation position $\phi_n$. In the latter expression, N is the number of interpolations. Then, $DD_\phi S_n = DD_\phi S_n \mp N$.

Subsequently, in the CPU, it is decided whether or not the computed and corrected coordinates $x_n$, $y_n$, $z_n$ of the next interpolation point exceed the coordinates ($x_2$, $y_2$, $z_2$) of the destination point $P_2$ with respect to the respective axes (block 812). In this case, if the answer is NO, that is, if the interpolation point does not exceed the intended position, information about the position of this interpolation point and information about velocity are given by the CPU to the automatic welding apparatus 100 (block 814), and with this timing the timer T1 or T2 selected by the function selecting switch 502 is started (set) (block 816).

Accordingly, the various axis positioning devices for the apparatus 100, that is, the carriage 103 (X axis), the second frame body 104 (Y axis), the third frame body 106 (Z axis), the workpiece attaching tool 105 ($\theta$ axis) and the welding torch attaching tool 109 ($\phi$ axis) position the workpiece (not shown) and the welding torch 109 according to the information about position and about velocity provided as described above. The servo amplifier (not shown) in the servo system is constructed to produce clock signal conditions and null signal conditions similar to those in the prior art. At this point, the CPU detects whether or not a clock or null signal condition is obtained from the servo amplifier in the servo system (block 818).

FIG. 8 is an illustration showing the velocity condition of the servo system and serving to explain said clock or null signal condition. The horizontal axis represents position or timing and the vertical axis represents velocity. As can be also understood from FIG. 8, said clock signal condition occurs at the point where the positioning device enters the servo region on non-saturated region of the servo system and its velocity begins to lower. Further, said null signal condition is one which is obtained from the servo amplifier when it is position-controlled by the servo system. It is derived at a region (with almost stopping timing) very close to the target position. In other words, the null signal condition is derived at an approximately constant position regardless of velocity, and the clock signal condition has its deriving timing varied (as shown by a dotted line) according to velocity. Therefore, in this embodiment, it is so arranged that, of these clock and null signal conditions, one which is obtained with a quicker timing is detected.

Referring to FIG. 9, in the decision of whether or not a clock signal or null signal is obtained with respect to said axes X, Y and X, if the answer is YES, then the CPU again gives the apparatus 100 information about the position of the next interpolation position and information about velocity, and similar positioning is repeated (block 808). Reversely, if it is NO, the CPU decides whether or not the timer set at the time of outputting said information has timed up (block 820). When said clock or null signal is not obtained within a predetermined time despite the fact that the position information and velocity information have been outputted, it is assumed that some accident or error has happened to the equipment, and the path is traced back to the subroutine for errors (block 822). Desirably, it is so arranged that if this clock or null signal condition is obtained prior to the time-up, the timer is reset by this signal condition.

In addition, in the above described deciding action of the CPU (block 812), if it is decided that the next instructed position (interpolation point) will exceed the intended position, then the CPU gives the apparatus 100 position information about said intended position (in this case, point P2) and velocity information (block 824) instead of interpolation point and velocity information. In this case also, the timer is set (block 826). In this automatic welding apparatus 100, control is performed on the basis of said intended position and velocity information, and a clock or null signal condition is sent to the CPU. At this point, if neither of the signal conditions is obtained, the path is traced back to the error routine, as described above (blocks 828, 830 and 832).

When the various axis positioning devices reach said intended position and a clock or null signal condition is obtained, the CPU reads the previously programmed timer set time (which has been selected so as to provide the time necessary for the after-treatment in the welding apparatus 100) from the memory 440 and performs the timer treatment (blocks 834 and 836). Upon the lapse of a certain time, the welding apparatus 100 and the welding power source 200 are turned off (block 838). Further, if some sequence signal has been set by the sequence selecting switch 424, a sequence signal corresponding thereto is produced and the linear interpolation is finished upon arrival of a corresponding signal from the outside equipment (blocks 840 and 842). In addition, at this time, if no signal is inputted in response to said sequence signal, then this is taken as indicating that there is an error, and the CPU enters the error routine. Upon completion of this linear interpolation, the CPU again returns to the main routine.

Figure 7B:
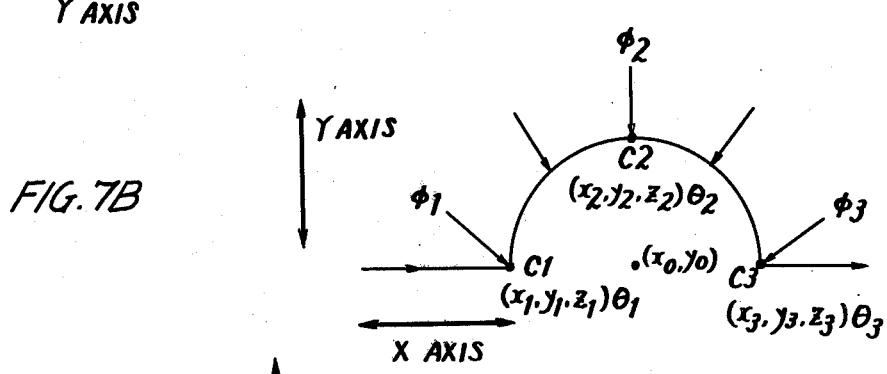
Figure 12A:
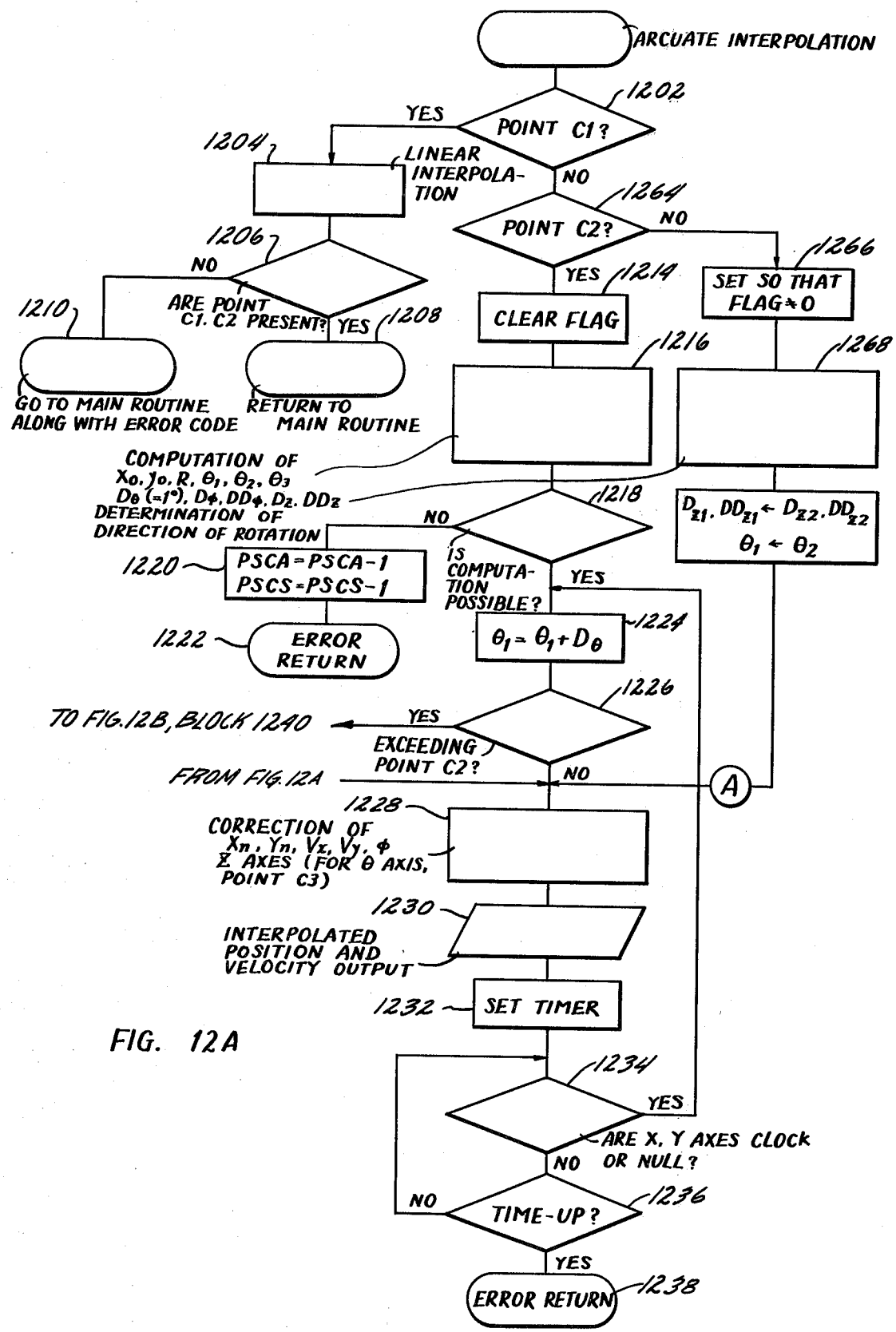
FIGS. 12A and 12B are a detailed flowchart showing an "arcuate interpolation" operating mode.
Figure 12B:
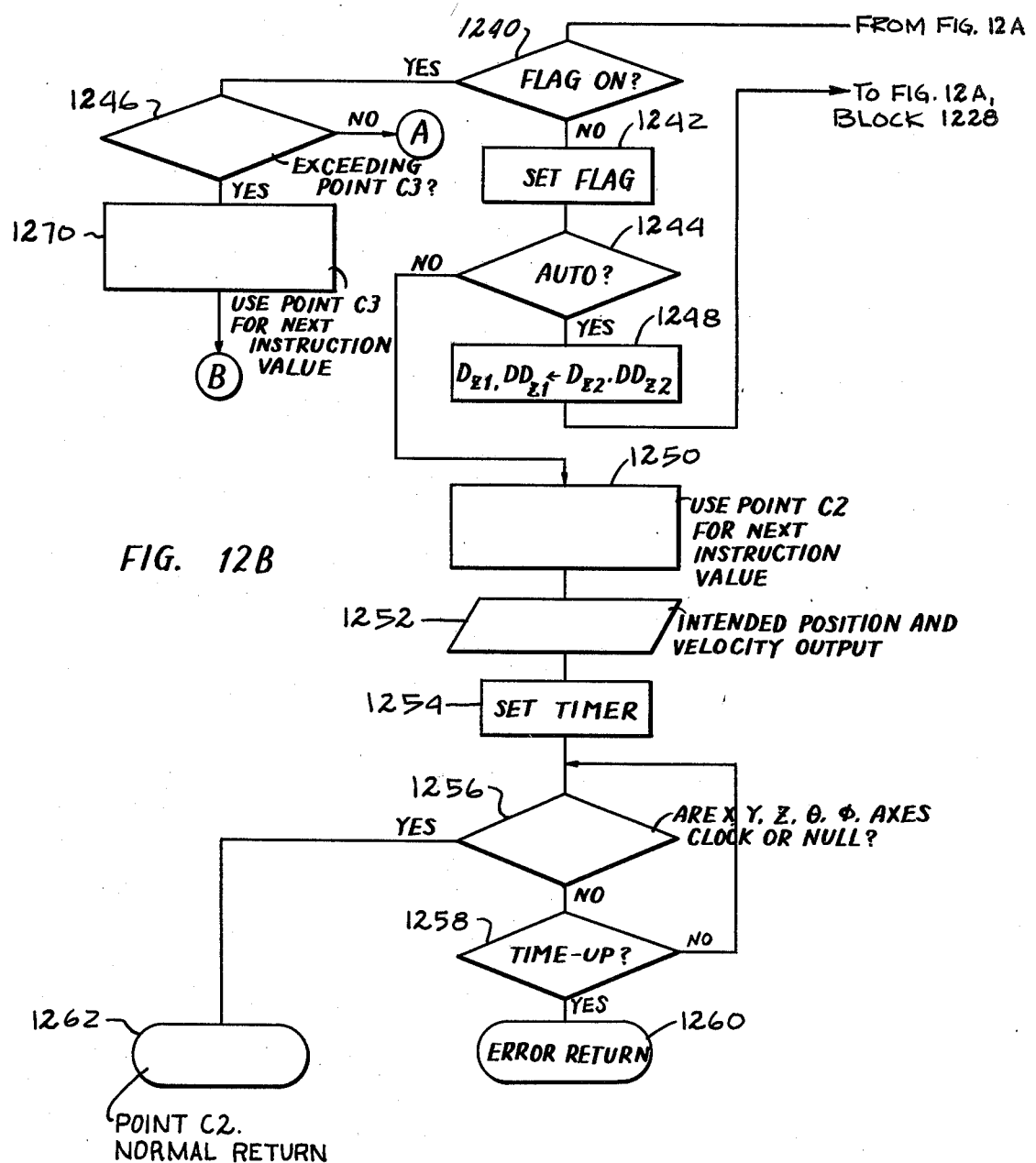

FIG. 7B shows the coordinates of points which explain the operation in an arcuate interpolation, and FIGS. 12A-B are flowcharts showing a subroutine defining the operation thereof. An "arcuate interpolation" mode will be described with reference to FIGS. 7B and 12A-B. In this mode, the CPU controls the torch 109 of the automatic welding apparatus 100 so that it may be moved in a polygonal line or nearly in an arc while interpolating between three indicated points.

First, the CPU takes the above described "linear interpolation" mode so that the torch 109 may be moved to a point C1 on the basis of linear interpolation. Therefore, if it is decided that there is such point C1 (block 1202), a linear interpolation (block 1204) is effected till the point C1. With the linear interpolation completed, if there are points C1 and C2 (block 1206), the path from C1 to C3 is for an arcuate interpolation and the CPU is returned to the main routine (block 1208). Further, if there are no such points C1 and C2, it returns to the main routine along with an error code (block 1210). In the case where there are points C2 and C3, the point C2 is indicated (block 1212) and the CPU again enters the subroutine (block 1216).

Also, the flag is cleared (block 1214), which flag is taken, for example, as "0" when moving from point C1 to point C2.

Subsequently, on the basis of the position information about these points C1, C2 and C3 programmed in said memory 440, the coordinates $x_0$, $y_0$ of the center of this arc and the radius R are computed. That is, said coordinates $x_0$ and $y_0$ are given by the following equations (9) and (10), and the radius R is given by the following equation (11).

$$x_0 = \{(y_3-y_2) \cdot \alpha 1 - (y_2-y_1) \cdot \alpha 2\}/2\beta \quad (9)$$

$$y_0 = \{(x_2-x_1) \cdot \alpha 2 - (x_3-x_2) \cdot \alpha 1\}/2\beta \quad (10)$$

$$R = \sqrt{(x_1-x_0)^2 + (y_1-y_0)^2} \quad (11)$$

where $$\alpha 1 = y_2^2 + x_2^2 - y_1^2 - x_1^2, \quad \alpha 2 = y_3^2 + x_3^2 - y_2^2 - x_2^2,$$

$$\beta = (x_2-x_1)(y_3-y_2) - (x_3-x_2)(y_2-y_1)$$

On the basis of the coordinates $x_0$, $y_0$ of the center and the radius R, the angles $\theta_1$, $\theta_2$ and $\theta_3$ which the points C1, C2 and C3 form with the X axis with respect to said center are computed. These angles $\theta_1$, $\theta_2$ and $\theta_3$ are given by the following equations (12), (13) and (14), respectively.

$$\theta_1 = \cos^{-1} \frac{x_1 - x_0}{R} \quad (12)$$

$$\theta_2 = \cos^{-1} \frac{x_2 - x_0}{R} \quad (13)$$

$$\theta_3 = \cos^{-1} \frac{x_3 - x_0}{R} \quad (14)$$

Therefore, the CPU or the memory 440 contains a table of trigonometric functions. In addition, the previously mentioned pitch $D_\theta$ is 1° so that the angle $\theta$ may gain 1° per pitch.

Further, at this point, the angle at which the torch 109 is directed to each interpolation point, that is, one pitch $D_\phi$ in the direction of the $\phi$ axis is computed. Thus, the component in the direction of the $\phi$ axis, or the pitch $D_\phi$ is given on the principle of proportional distribution at the angle difference $(\theta_2 - \theta_1)$ from point C1 to point C2 and at the angle difference $(\theta_3 - \theta_2)$ from point C2 to point C3. Therefore, the pitches $D_{\phi 1}$ and $D_{\phi 2}$ are given by the following equations (15) and (16), respectively.

$$D_{\phi 1} = \frac{\phi_2 - \phi_1}{\theta_2 - \theta_1} \ldots DD_{\phi 1} \quad (15)$$

$$D_{\phi 2} = \frac{\phi_3 - \phi_2}{\theta_3 - \theta_2} \ldots DD_{\phi 2} \quad (16)$$

The components $D_{\phi 1}$ and $D_{\phi 2}$, in other words, are changes in the torch disposition angle produced each time said angle $\theta$ changes 1°. And, the remainders (error components which result from the fractional part of a decimal fraction being discarded in the CPU as in the case of a "linear interpolation") $DD_{\phi 1}$ and $DD_{\phi 2}$ are corrected along with the Z axis direction at the time of error correction to be described later.

Further, at this time, in order to make corrections in the Z axis direction when a workpiece (not shown) is attached to the attaching tool 105 at an angle with the Z axis, the components $D_{z1}$ and $D_{z2}$ in the Z axis direction per pitch are computed. These Z axis direction components or $D_{z1}$ and $D_{z2}$ are given on the principle of proportional distribution with respect to the pitch $D_\theta$ as in the case of the pitch $D_\phi$. That is, these pitches $D_{z1}$ and $D_{z2}$ are given by the following equations (17) and (18), respectively.

$$D_{z1} = \frac{z_2 - z_1}{\theta_2 - \theta_1} \ldots DD_{z1} \qquad (17)$$

$$D_{z2} = \frac{z_3 - z_2}{\theta_3 - \theta_2} \ldots DD_{z2} \qquad (18)$$

In addition, the remainders $DD_{z1}$ and $DD_{z2}$ produced at this time are used for error corrections to be described later, as in the case of said remainders or error components $DD_{\phi 1}$ and $DD_{\phi 2}$. Thereafter, the direction of rotation (clockwise or counterclockwise) in connection with the angle $\theta$ is determined by said $\theta_1$, $\theta_2$ and $\theta_3$.

Although three points are indicated in the program, these three points are substantially one point or two, and it may happen that these three points are points on a straight line. Thus, it is then decided whether or not the computation is possible (block 1218). If the answer is NO, then the absolute step number "PSCA" for all steps and the present step number "PSCS" for the workpiece under consideration will each have $-1$ added thereto, and the CPU returns to the error subroutine (blocks 1220 and 1222). Further, if it is YES, then computations for interpolation will be carried out.

First, said $D_\theta$ is added to the angle $\theta_1$ of said point C1 with the X axis (block 1224). At this time, it is decided whether or not the point to be next interpolated exceeds the point C2 (block 1226).

If the next interpolation point does not exceed the point C2, this means that the torch 105 is allowed to move to this interpolation point. Thus, the CPU computes the position information about the interpolation point under consideration and the velocity information and gives the results to the automatic welding apparatus 100. That is, the coordinates $x_n$, $y_n$ of the next interpolation point are given by the following equations (19) and (20), respectively.

$$x_n = x_0 + R \cos \theta_1 \qquad (19)$$

$$x_n = y_0 + R \sin \theta_1 \qquad (20)$$

Further, at this time, on the basis of the velocity V provided by the velocity selecting switch 501 on the remote control panel 500 and programmed, the velocities $V_x$ and $V_y$ in the directions of the axes X and Y are computed. These velocities $V_x$ and $V_y$ are given by the following equations (21) and (22), respectively.

$$V_x = V \sin \theta_1 \qquad (21)$$

$$V_y = V \cos \theta_1 \qquad (22)$$

At the same time, the disposition angle $\phi$ of said torch 109 and the Z axis direction are corrected. The corrections of the Z axis direction and $\phi$ axis direction are made on the principle of proportional distribution for each said interpolation of $D_\phi$, as described above, and given by the following equations (23) and (24), respectively.

$$\phi_n = \phi + D_\phi \qquad (23)$$

$$z_n = z + D_{z1} \qquad (24)$$

At this point, since the point C2 is not exceeded, $D_{z1}$ is added in the correction of the Z axis direction (block 1228). In this way, instructions for the coordinates of the point to be next interpolated, and for velocities are given to the automatic welding apparatus 100 from the CPU. That is, given to the apparatus 100 are instructions for the coordinates on the axes X, Y, $\phi$ and Z given by the above mentioned equations (19), (20), (23) and (24), for the axis velocities $V_x$ and $V_y$ given by the equations (21) and (22), and for the $\theta$ axis. Accordingly, the power means for the axes X, Y, Z, $\theta$ and $\phi$ in the apparatus 100 move the positioning devices and effect position control of said instructed interpolation point (block 1230).

In addition, at this time, the timer T1 or T2 is set (block 1232) and if a clock or null signal from the axes X and Y is not obtained after the lapse of a certain time (blocks 1234, 1236), then the CPU is returned to the subroutine for error treatment (block 1238).

And, when a clock or null signal condition is obtained from each of the axes X and Y, the CPU gives the apparatus 100 position and velocity information about a point to be next interpolated. In this way, the arc is repeatedly interpolated in a nearly polygonal line fashion until the point C2 is reached.

Thereafter, said point comes to be exceeded and the answer to said decision block 1226 (Is C2 exceeded?) becomes YES. In this case, it is decided whether or not the flag (which is taken, for example, as "1" when moving to point C2 to point C3) is turned on (block 1240-FIG. 12B), and if the answer is YES, then it is decided whether or not the point C3 is exceeded (block 1246). If the answer to block 1240 is NO, the flag is set (block 1242) and it is decided whether or not the mode is "AUTO" (block 1244). At this time, since the apparatus has been changed to the "AUTO" mode, the answer is, of course, YES. In the case of the "AUTO" mode with the point C2 exceeded as described above, corrections are made with the corrected value $D_{z1}$ in the Z axis direction replaced by $D_{z2}$ and the error component $DD_{z1}$ replaced by $DD_{z2}$ (block 1248). That is, when the point C2 is exceeded, the Z axis direction is corrected according to the following equation (25).

$$z_n = z + D_{z2} \qquad (25)$$

As for the other axis position information and velocity information, what is obtained by the equations (19), (20), (23) and (21), (22) is given. In addition, the $\phi$ axis direction also is corrected and interpolated in increments of $D_\theta (= 1°)$.

Further, in determining said interpolation position, the error components $DD_{z1}$ (or $DD_{z2}$) and $DD_{\phi 1}$ (or $DD_{\phi 2}$) are corrected, as in the case of "linear interpolation". For example, to explain with reference to the Z axis, first, in the case of a section from point C1 to point C2 (or from C2 to point C3), the error components $DD_{z1}$ (or $DD_{z2}$) are added and it is decided whether or not the sum $DD_{z1}S_n$ (or $DD_{z2}S_n$) exceeds 1 (bit) for the number of interpolation points or number of interpolations N (or M) in that region, and corrections are made. That is, if $$\frac{DD_{z1}S_n}{N} \left( \text{or} \frac{DD_{z2}S_n}{M} \right) \geq \pm 1,$$

then a correction by ±1 is made with respect to said interpolation position $z_n$. Similarly, for the $\phi$ axis, if $$\frac{DD_{\phi 1}S_n}{N} \left( \text{or} \frac{DD_{\phi 2}S_n}{M} \right) \geq \pm 1$$

then a correction by ±1 is made with respect to said interpolation position $\phi_n$. Such corrections of the Z and $\phi$ axes are simultaneously made at the time of computing the position of the point to be next interpolated.

In addition, in the case where the mode is not the "AUTO" mode (for example, it is the test mode) with the point C2 exceeded as described above, the CPU gives said point C2 as the next instruction to the apparatus 100 (block 1250). Along with this, instructions for velocity are also given (block 1252). Accordingly, the apparatus 100 positions the axes X, Y, Z, $\theta$ and $\phi$. At this time, if the timer is set and a clock or null signal condition is not obtained after the lapse of a certain time (blocks 1254, 1256, 1258), this is taken to indicate the existence of an error and the CPU is returned to the error routine (block 1260). If a clock or null signal condition is obtained from each of the axes, then the CPU is returned to the point C2 normal routine (block 1262).

Further, in the case of this test mode (not "AUTO"), when the apparatus 100 moves to the point C2 while interpolating, it should then be allowed to move to the point C3. Therefore, the answer to the decision block 1264 (FIG. 12A) (point C2?) is, of course, NO and hence the flag is set so that it is not "0" (block 1266). In such case, again, the CPU computes the coordinates $x_0$, $y_0$ of the center of an arc to be drawn and its radius, R and the positions $\theta_1$, $\theta_2$, $\theta_3$ of the points C1, C2, C3 in the $\theta$ axis direction, the pitch $D_\phi$ (error component $DD_\phi$) in the $\phi$ axis direction, and the pitch $D_z$ (error component $DD_z$) in the Z axis direction, according to the above equations (9), (10), (11), (12), (13), (14), (15), (16) and (17), (18) (block 1268). Performing these computations again in this way will also serve to see if there is a mistake in the previous computations. Thereafter, as in the case of moving from said point C1 to point C2, M interpolating actions from point C2 to point C3 are performed. At this time, since the point C2 has been exceeded and the flag has been set, in the CPU, each time said interpolation from the point C2 to the point C3 is performed, it is decided whether or not the next interpolation point exceeds the point C3 (block 1246-FIG. 12B). If the answer is NO, then the CPU returns to the routine indicated at A (FIG. 12A) and the welding torch progressively moves until it comes just short of the point C3 while interpolations are being made.

When the welding torch 109 reaches the point C3, the CPU uses the position information about the point C3, which is the goal, as the next instructions to the apparatus 100 (block 1270-FIG. 12B). Then, the CPU shifts to the routine indicated at B in FIG. 9. Therefore, the CPU outputs the position information about the point C3 and velocity information with respect to the apparatus 100 (block 824). Accordingly, the apparatus 100 positions the axes X, Y, Z, $\theta$ and relative to the point C3. In this way, interpolations are succesively made from the point C1 to C2 and then to the point C3, with the result that an arc is drawn in a polygonal line.

Figure 7C:
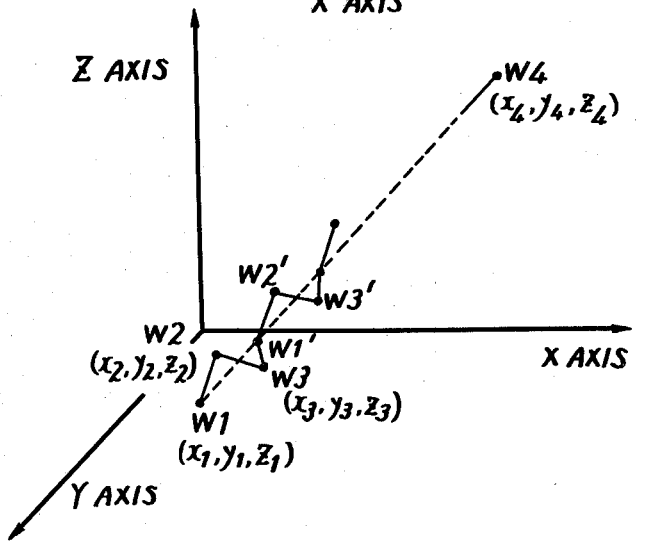
Figure 13:
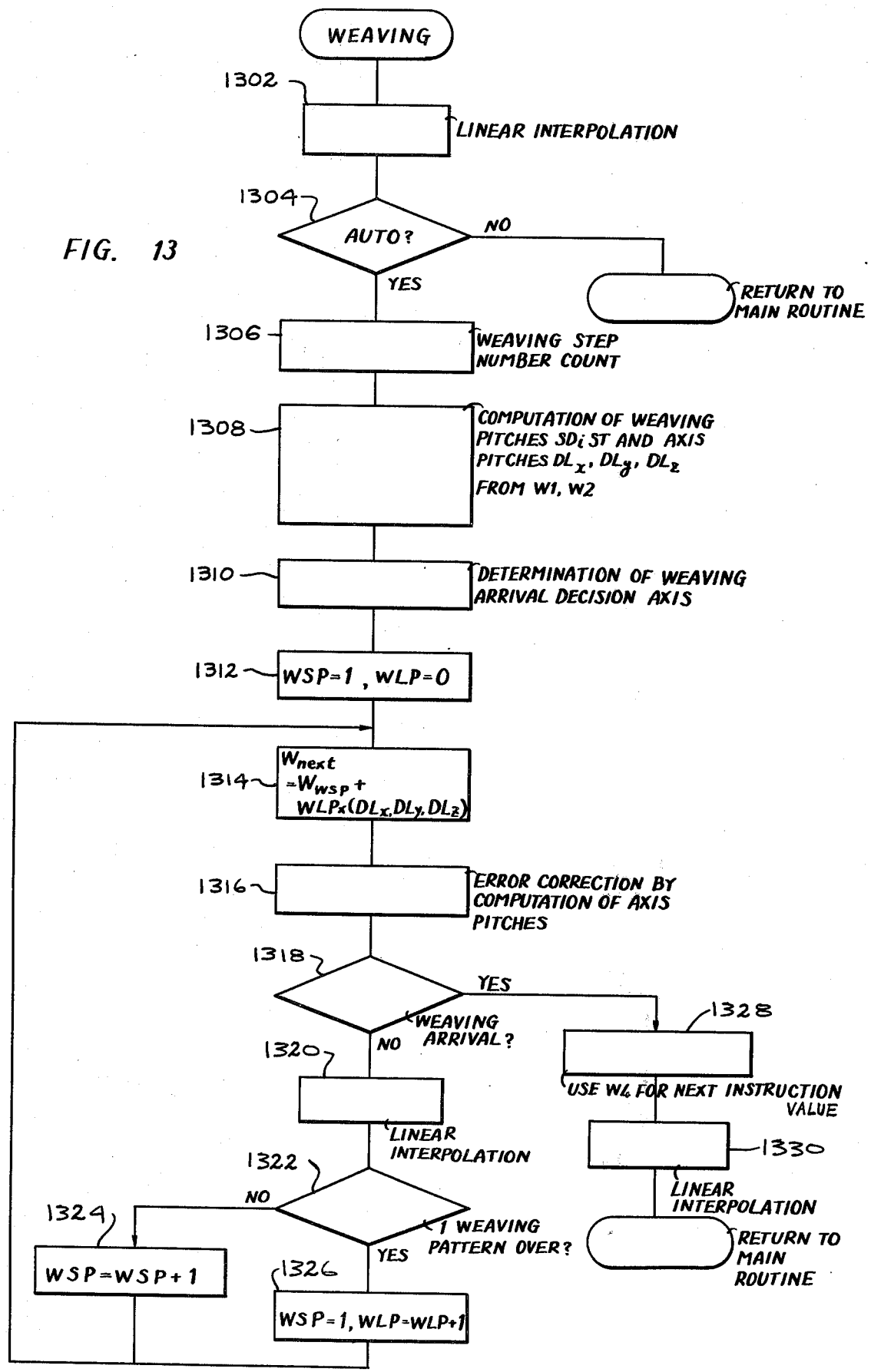
FIG. 13 is a detailed flowchart showing a "weaving" operating mode.

FIG. 7C is a view showing the coordinates of points for explanation of the operation of weaving, and FIG. 13 is a flowchart of a subroutine showing the operation thereof. Finally, a "weaving" mode will be described with reference to FIGS. 7C and 13. In this mode, the CPU controls the torch 109 of the automatic welding apparatus 100 so that it may move to the terminal point while repeating an indicated weaving pattern.

First, the CPU takes the above described "linear interpolation" mode (block 1302) so that the torch 109 may move while making linear interpolations until a weaving start point W1 is reached. At the point W1, it is decided whether or not the mode is "AUTO" (block 1304), and in this case, the answer is, of course, YES.

Therefore, the CPU counts the number of weaving steps (block 1306). In this embodiment, the programmed points are W1, W2, W3 and W4, and hence the count is "4". This weaving step number is represented by the label "WSP" to be described later.

Subsequently, in the CPU, 1 weaving pitch SDiST and pitches $DL_x$, $DL_y$ and $DL_z$ in the directions of the axes X, Y and Z are computed (block 1308) from the coordinates of the weaving start point W1 and of a point which is one point short of the terminal point of one cycle of weaving (in this embodiment, the point W3). This 1 weaving pitch SDiST is obtained by the following equation.

$$SDiST = \sqrt{(x_3 - x_1)^2 + (y_3 - y_1)^2 + (z_3 - z_1)^2}$$

Therefore, the weaving pitches $DL_x$, $DL_y$ and $DL_z$ in the directions of the individual axes may be obtained by computing cosines with respect to the pitch SDiST expressed by the above equation. That is, 1 weaving pitch $DL_x$ in the X axis direction is given by the following equation (26), 1 weaving pitch $DL_y$ in the Y axis direction is given by the following equation (27) and 1 weaving pitch $DL_z$ in the Z axis direction is given by the following equation (28).

$$DL_x = \frac{SDiST \cdot (x_4 - x_1)}{\sqrt{(x_4 - x_1)^2 + (y_4 - y_1)^2 + (z_4 - z_1)^2}} \ldots XQ \quad (26)$$

$$DL_y = \frac{SDiST \cdot (y_4 - y_1)}{\sqrt{(x_4 - x_1)^2 + (y_4 - y_1)^2 + (z_4 - z_1)^2}} \ldots YQ \quad (27)$$

$$DL_z = \frac{SDiST \cdot (z_4 - z_1)}{\sqrt{(x_4 - x_1)^2 + (y_4 - y_1)^2 + (z_4 - z_1)^2}} \ldots ZQ \quad (28)$$

Here the remainders or error components XQ, YQ and ZQ obtained with respect to the respective axes X, Y and Z are used for error corrections each time 1 weaving cycle is completed, as in the case of the above described "linear interpolation" and "arcuate interpolation", as will be described later.

A weaving arrival decision axis is then determined (block 1310). The determination of this weaving arrival decision axis supports the axis which has the greatest of the values $(x_4 - x_1)$, $(y_4 - y_1)$ and $(z_4 - z_1)$. That is, of the axes X, Y and Z, the one associated with the greatest component is selected, and such selected axis will henceforth be used in deciding whether or not the weaving has arrived.

The counter for the weaving step number "WSP" is set to "1" and the counter for the weaving cycle number "WSP" is initially set to "0" (block 1312).

After such initial conditions have been established, the points to be interpolated (for example, points W1', W2′, etc., in FIG. 7c) are computed. The next interpolation point $W_{next}$ is given by the following equation (29).

$$W_{next} = W_{wsp} + WLP \times (DL_x, DL_y, DL_z) \qquad (29)$$

where $W_{wsp}$ represents the position in the step indicated by said weaving step number "WSP". In this case, the position of the next interpolation point $W_{next}$ is given with reference to the axes X, Y and Z (block 1314).

Here said error corrections are made on the basis of whether or not said axis error components XQ, YQ, and ZQ exceed 1 (bit) in the repetition of the weaving cycle, as in the case of "linear interpolation" and "arcuate interpolation" (block 1316). To explain, with reference to, for example, the X axis, the sum XQS of the error components is expressed by the following equation (30), and if the value $XQS \geq \pm 1$ then $\pm 1$ is added to the X axis direction component of said interpolation point $W_{next}$.

$$XQS = \frac{XQ \cdot WLP}{\sqrt{(x_4 - x_1)^2 + (y_4 - y_1)^2 + (z_4 - z_1)^2}} \qquad (30)$$

At the same time, as for the Y and Z axes, it is decided whether or not the respective sums YQS and ZQS exceed 1 (bit). Such corrections are made upon completion of each weaving cycle.

And in the CPU, it is decided whether or not the weaving has arrived (block 1318) by deciding whether or not said next interpolation point $W_{next}$ exceeds the weaving terminal point (in this embodiment, W4). In making such decision, a comparison is made with respect to said one axis selected in the manner described above.

Here if the answer is NO, that is, if the weaving terminal point W4 has not yet been reached, then the "linear interpolation" is continued until the interpolated point $W_{next}$ (block 1320). And, by counting the weaving step number "WSP", it is decided whether or not 1 cycle pattern or weaving has ended (block 1322). That is, during the operation of such successive interpolations, the weaving step number "WSP", in this embodiment, is "4−1=3" and when the step number becomes "3", it is decided that 1 weaving pattern has ended.

If 1 weaving pattern has not yet ended, the CPU adds ±1 to the weaving step number "WSP" (block 1324) and again gives the next interpolation point $W_{next}$ (block 1314). When 1 weaving pattern ends, the CPU sets the weaving step number "WSP" to 1 to restore it to its initial condition (block 1326) and again computes the position of the next interpolation point $W_{next}$ (block 1314).

In decision block 1318 (Has the weaving arrived?), if the answer is YES, then the CPU gives the apparatus 100 the weaving terminal point (in this embodiment, W4) as the next instruction position (block 1328). Therefore, the apparatus 100 is then moved to the terminal point W4 in a "linear interpolation"fashion (block 1330). By programing the initial weaving pattern and the weaving terminal point in this way, welding is carried out while repeating the same weaving pattern from the weaving start point to the weaving terminal point.

In addition, in this weaving mode, the $\phi$ axis only correspondingly repeatedly assumes the various positions in 1 weaving pattern. Its velocity is determined in the same manner as in "linear interpolation".

As described above, in the position control apparatus of the present invention, movement or velocity control of an object to be controlled is effected on the basis of a preset program, but, for example, in the test mode or automatic operation mode, there may be a desire of controlling without resort to such programed information. For example, in the test mode, when the positions necessary for welding or other operation have been confirmed, it may be desired to carry out the test quickly without regard to the programed instruction velocity. Further, in the automatic operation mode, it may happen that the position of the workpiece is shifted from the actually programed tested position, and in this case, it may be desired to correct the program itself. Thus, it would be further convenient to provide a position control apparatus which is capable of making such corrections.

Accordingly, a method of controlling a position control apparatus which is capable of satisfying such desires will now be described.

Figure 14:
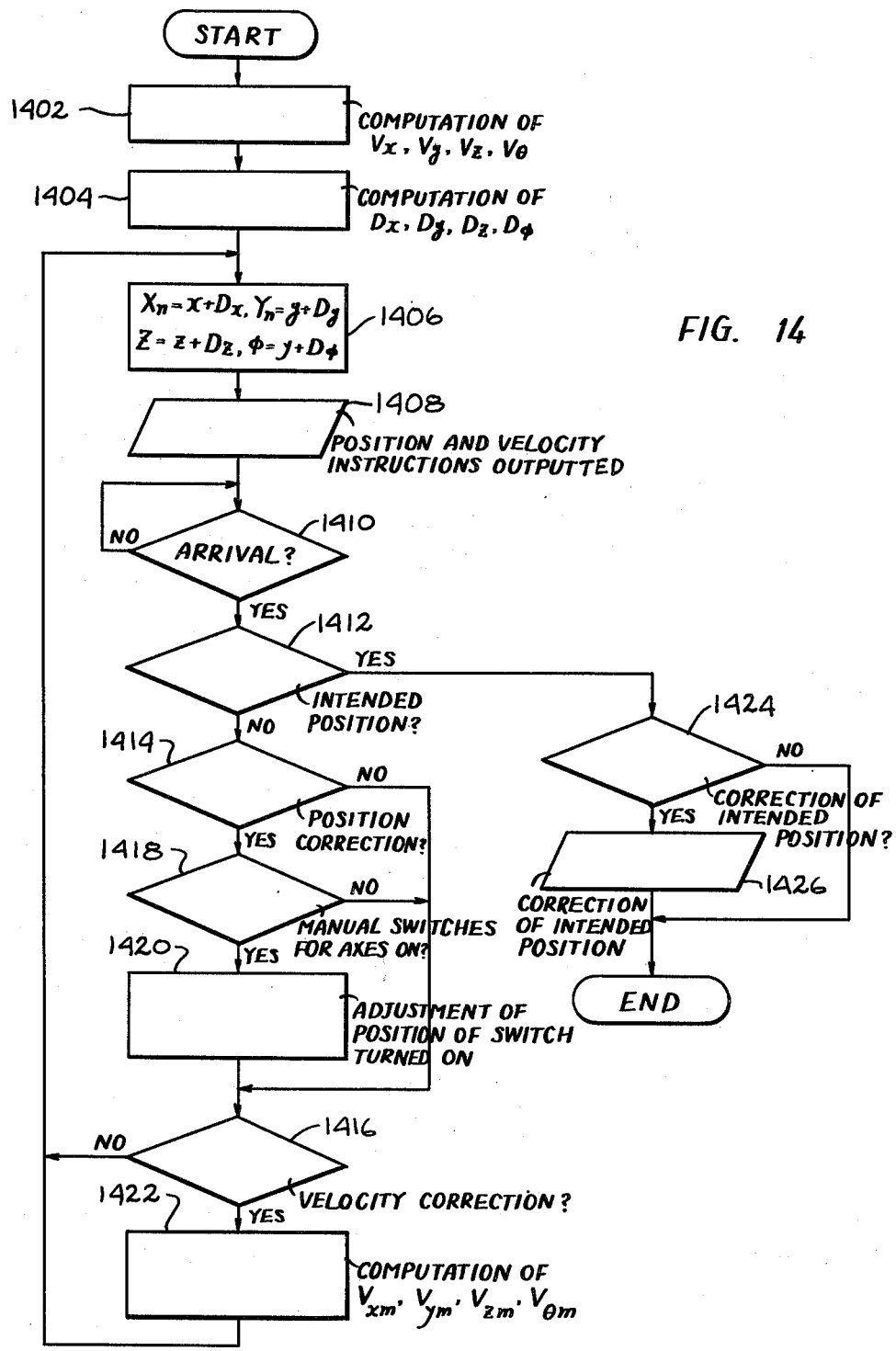
FIG. 14 is a flowchart showing an embodiment of the invention.

FIG. 14 is a flowchart showing an embodiment intended to achieve the above object. As a condition for accurately performing welding, it is required that the path and velocity be accurate. Now, in a movement from a point P1 ($x_1$, $y_1$, $z_1$) to a point P2 ($x_2$, $y_2$, $z_2$), if the rates of movement (velocity components) in the directions of the respective axes and the position of said point P2 are indicated, then the movement will be made at the resultant velocity V in a straight line until the intended position is reached.

However, in the case of using power means such as dc motors as in this embodiment, so long as a constant torque is obtained there will be no problem even if the speed is low. But a heavy load will result in a drooping characteristic. At this rate, therefore, one axis or another would reach the intended position earlier than the others, so that the position would become incorrect. It is possible to obtain the correct path and velocity by finely dividing (or interpolating) the distance between said points P1 and P2. In this way, in order to compensate for the drooping characteristic of the power means such as dc motors, the interpolating function becomes necessary.

As described above, the CPU decides that the movement between the two indicated points should be by a linear interpolation, and a welding signal is given to the automatic welding apparatus 100. Then, velocities $V_x$, $V_y$, $V_z$ and $V_\theta$ for the respective axes X, Y, Z and $\theta$ are computed (block 1402) by reading the velocity V indicated by the velocity selecting switch 501 and the programmed coordinates from the memory 440. That is, the velocities $V_x$, $V_y$, $V_z$ and $V_\theta$ in the directions of the axes X, Y, Z and $\theta$, respectively, are given by the following equations (31), (32), (33) and (34), respectively.

$$V_x = \frac{V \cdot (x_2 - x_1)}{\sqrt{(x_2 - x_1)^2 + (y_2 - y_1)^2 + (z_2 - z_1)^2}} \qquad (31)$$

$$V_y = \frac{V \cdot (y_2 - y_1)}{\sqrt{(x_2 - x_1)^2 + (y_2 - y_1)^2 + (z_2 - z_1)^2}} \qquad (32)$$

$$V_z = \frac{V \cdot (z_2 - z_1)}{\sqrt{(x_2 - x_1)^2 + (y_2 - y_1)^2 + (z_2 - z_1)^2}} \qquad (33)$$

$$V_\theta = \frac{V \cdot K}{\sqrt{(x - 2048)^2 + (z - 2048)^2}} \qquad (34)$$

where $x_1$ and $x_2$ are X-coordinates; $y_1$ and $y_2$ are Y-coordinates; $z_1$ and $z_2$ are Z-coordinates; and K is a coefficient. In this connection, since the center position of the workpiece attaching tool 105 is set so that it is at the intersection between the center position of the X axis and the center position of the Z axis, the rotative velocity $V_\theta$ in the $\theta$ axis direction can be obtained by finding the distances from the center of the $\theta$ axis (the center 4096/2 of 4096 bits) to any points x and z on the X and Z axes, and hence it is as expressed by the equation (34). In addition, the coefficient K is the gear ratio, etc., from the power means to the workpiece attaching tool 105. In this way, the velocities in the directions of the X, Y, Z and $\theta$ axes ($\phi$ being unnecessary) can be obtained. The numerical value 2048 representing the center in the above equation (34) is not necessarily limited to this value.

Subsequently, in the CPU, the lengths (pitches) to the next interpolation points in the directions of the X, Y, Z and $\theta$ axes will be found. However, as for the $\phi$ axis, in order to control the torch 109 so that its tip is always at an optimum angle with the welding line, it is determined by means of proportional distribution with respect to the total number of interpolations (length/pitch=N). That is, the pitches $D_x$, $D_y$, $D_z$ and $D_\phi$ in the directions of the axes X, Y, Z and $\theta$ are given (block 1404) by the following equations (35), (36), (37) and (38), respectively.

$$D_x = \frac{D \cdot (x_2 - x_1)}{\sqrt{(x_2 - x_1)^2 + (y_2 - y_1)^2 + (z_2 - z_1)^2}} \quad (35)$$

$$D_y = \frac{D \cdot (y_2 - y_1)}{\sqrt{(x_2 - x_1)^2 + (y_2 - y_1)^2 + (z_2 - z_1)^2}} \quad (36)$$

$$D_z = \frac{D \cdot (z_2 - z_1)}{\sqrt{(x_2 - x_1)^2 + (y_2 - y_1)^2 + (z_2 - z_1)^2}} \quad (37)$$

$$D_\phi = \phi_2 - \phi_1/N \quad (38)$$

where D is the interpolation pitch and $\phi_1$ and $\phi_2$ are the angles at which the torch tip is disposed at points $P_1$ and $P_2$. In this way, 1 pitch and an error component in each of the directions of the axes X, Y, Z and $\phi$ are obtained.

Thereafter, in the CPU, the positions $x_n$, $y_n$, $z_n$ and $\phi_n$ of the next point to be interpolated are found. They can be obtained by adding said axis pitches $D_x$, $D_y$, $D_z$ and $D_\phi$ to the initial positions (in this case, $x_1$, $y_1$, $z_1$ and $\phi_1$) on the axes in the coordinate system (block 1406). That is, they are obtained as the X-coordinate $x_n = x + D_x$, Y-coordinate $y_n = y + D_y$, Z-coordinate $z_n = z + D_z$ and $\phi$-coordinate $\phi_n = \phi + D_\phi$. The CPU gives the thus found interpolation position $P_n$ as the next position instructions to the various axes of the apparatus 100 (block 1408).

Accordingly, the various axis positioning devices for the apparatus 100, that is, the carriage 103 (X axis), the second frame body 104 (Y axis), the third frame body 106 (Z axis), the workpiece attaching tool 105 ($\theta$ axis) and the welding torch attaching tool 109 ($\phi$ axis) position the workpiece (not shown) and the welding torch 109 according to the information about position and about velocity provided as described above. At this point, the CPU detects whether or not a clock or null signal condition is obtained from the servo amplifier (not shown) in the servo system, or whether or not it has arrived (block 1410).

Referring back to FIG. 14, in the above decision, if the answer is YES, then the CPU decides whether or not that point is the (final) intended position (block 1412).

If the answer is NO, then it is decided whether or not the mode is the position correction mode (block 1414).

The CPU gives a decision thereon according to whether or not the correction switch 526 on said remote control panel 500 has been depressed. That is, if said switch 526 has been depressed and the lamp 5261 has been lighted, then it is the position correction mode. If the answer is NO, then the CPU decides whether or not the mode is the velocity correction mode to be described later (block 1416).

On the other hand, if a position correction is necessary, the manual (toggle) switches 521, 522, 523, 524 and 525 on the remote control panel 500 for the respective axes are tilted from their neutral positions in the desired directions (right, left, clockwise or counter-clockwise) (block 1418,1420). Accordingly, the positioning devices for the respective axes of the automatic welding apparatus 100, that is, the carriage 103, second frame body 104, arm 107, workpiece attaching tool 105 and welding torch attaching tool 108 are moved in said desired directions as long as said manual switches 521-525 are being manipulated. In this way, by a manual operation it is possible to control the positions of the various axes, that is, the relative position between the workpiece and the welding torch.

Therefore, in the above decision step "position correction ?" (block 1414), if the answer is YES, then it is decided whether or not a position correction has been actually made by deciding whether or not the manual switches 521-525 on (block 1418) the remote control panel 500 are "on". If the answer is NO, then the decision step "velocity correction?" is taken (block 1416). If the answer is YES, the axis positions $x_n$, $y_n$, $z_n$, $\theta_n$, $\phi_n$ of the interpolation point $p_n$ are adjusted according to the switches that have been turned on (block 1420). The position information thus corrected are then reprogrammed in the memory.

Subsequently, the CPU decides whether or not the mode is for velocity correction (block 1416). This decision can be made by finding whether or not the velocity correcting switch 502 on the remote control panel 500 has been depressed. If the answer is NO, then instructions for the next interpolation point will be given (block 1406).

If it is YES, the corrected velocities $V_{xm}$, $V_{ym}$, $V_{zm}$ and $V_{\theta m}$ of the various axes X, Y, Z and $\theta$ are computed (block 1422). If $V_m$ represents the system (resultant) velocity reset by the velocity selecting switch 501 after the correction switch 502 is depressed, then $V_{xm}$, $V_{ym}$, $V_{zm}$ and $V_{\theta m}$ are obtained by the following equations (39)–(42).

$$V_{xm} = V_x \times V_m / V \quad (39)$$

$$V_{ym} = V_y \times V_m / V \quad (40)$$

$$V_{zm} = V_z \times V_m / V \quad (41)$$

$$V_{\theta m} = V_\theta \times V_m / V \quad (42)$$

when the computations of the axis velocities $V_{xm}$, $V_{ym}$, $V_{zm}$ and $V_{\theta m}$ are completed in this way, instructions for the next interpolation point will be given.

Therefore, the movement henceforth will be made according to said corrected velocities. Further, it is only necessary to use said corrected velocities in the case of test mode, and there is no need to change the velocity information of the program itself.

Further, in the above mentioned deciding step "intended position ?" (block 1412), if the answer is YES, then the CPU decides whether or not it is a correction of the intended position (block 1424). This correction of the intended position is achieved by manipulating the manual switches 521-525 after depressing the correction switch 526 on the remote control panel 500 (block 1426). This corrected intended position is written in the program.

The arrangement of touch signal outputting means TO which is a preferred embodiment of the present invention will now be described.

Figure 15:
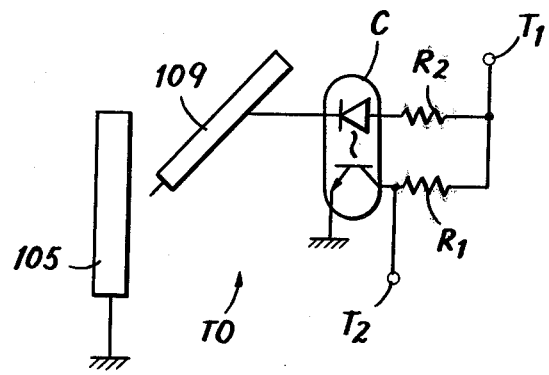
FIGS. 15 through 17 are circuit diagrams showing different embodiments of contact signal output means TO FIGS. 18A, 18B and 18C are flowcharts of an embodiment.

Referring to FIG. 15, there is shown an embodiment of touch signal outputting means TO, wherein C denotes coupler; R1 and R2 denote resistors; T1 denotes a power source terminal; and T2 denotes an output terminal. The means is connected to the torch 109 in the manner shown.

Figure 16:
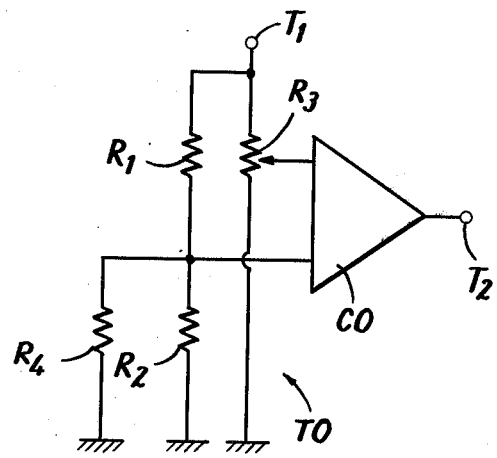

FIG. 16 shows an embodiment, wherein CO denotes a comparator; T1 and T2 denote terminals similar to those mentioned above; R1 and R2 denote resistors similar to those mentioned above; R3 denotes a variable resistor; and R4 denotes an equivalent resistor having the same resistance as the electric resistance between the torch 109 and the attaching tool 105, and it is illustrated therein in place of the torch 109 and the attaching tool 105, the rest being connected in the manner shown.

Figure 17:
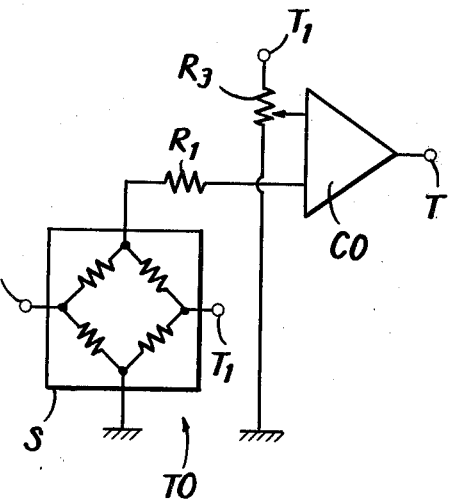

FIG. 17 shows a further embodiment, wherein S denotes a bridge-connected strain gauge; T1 and T2 denote terminals similar to those mentioned above; R1 and R3 denote resistors similar to those mentioned above; and CO denotes a comparator similar to that mentioned above and connected as shown. In addition, the strain gauge S is bonded to the attaching tool 108 and adapted to be actuated by strains produced in the attaching tool 108.

Functions of these embodiments will now be described. In the embodiment shown in FIG. 15, if there is no touch between the workpiece attaching tool 105 and the welding torch 109, as shown, then no current flows through the coupler C and hence no output appears at the terminal T2. If the workpiece attaching tool 105 and the welding torch 109 touch each other, conduction is established therebetween, so that a current flows through the coupler C and an output signal appears at the terminal T2, driving the latter to the zero level.

In FIG. 16, if the resistance of the resistor R4 is decreased (at the time of said touching), the comparison potential at the comparator CO becomes lower than the reference potential provided by the resistor R3, so that a signal is outputted from the terminal T2.

In FIG. 17, a strain produced in the attaching tool 108 causes the output from the strain gauge S to vary, so that a signal is outputted from the terminal T2.

Therefore, according to these embodiments, whenever any portion of the welding torch 109 touches another object, a touch signal can be outputted.

As for the contents of the control box 400 (FIG. 2), there are two types of embodiments of the present invention. One type has a computer not shown, but—as previously mentioned—contained within pattern rack 430) which, as is known, comprises an arithmetic unit and a CPU such as a microprocessor, and a control unit and a memory not shown, but—as previously mentioned—contained within pattern block 440); using wires or the like, the other type has a control circuit using hardware to be described later.

The embodiment having the computer will first be described. The user pre-teaches a user program of the PTP type to the memory, and in this embodiment, instructions for the positioning and rates of movement of the axes X, Y, Z, θ and φ of the automatic welding apparatus 100, for welding conditions and for sequence control are recorded in the memory according to the known playback system. A system program (which is a common program prepared in advance in common with automatic welding operations) related to this teaching operation will be described with reference to FIGS. 18A, B and C. (While various system programs are prepared in the computer, only those parts which are directly connected with this embodiment will be described herein, omitting a description of the irrelevant parts).

Figure 18A:
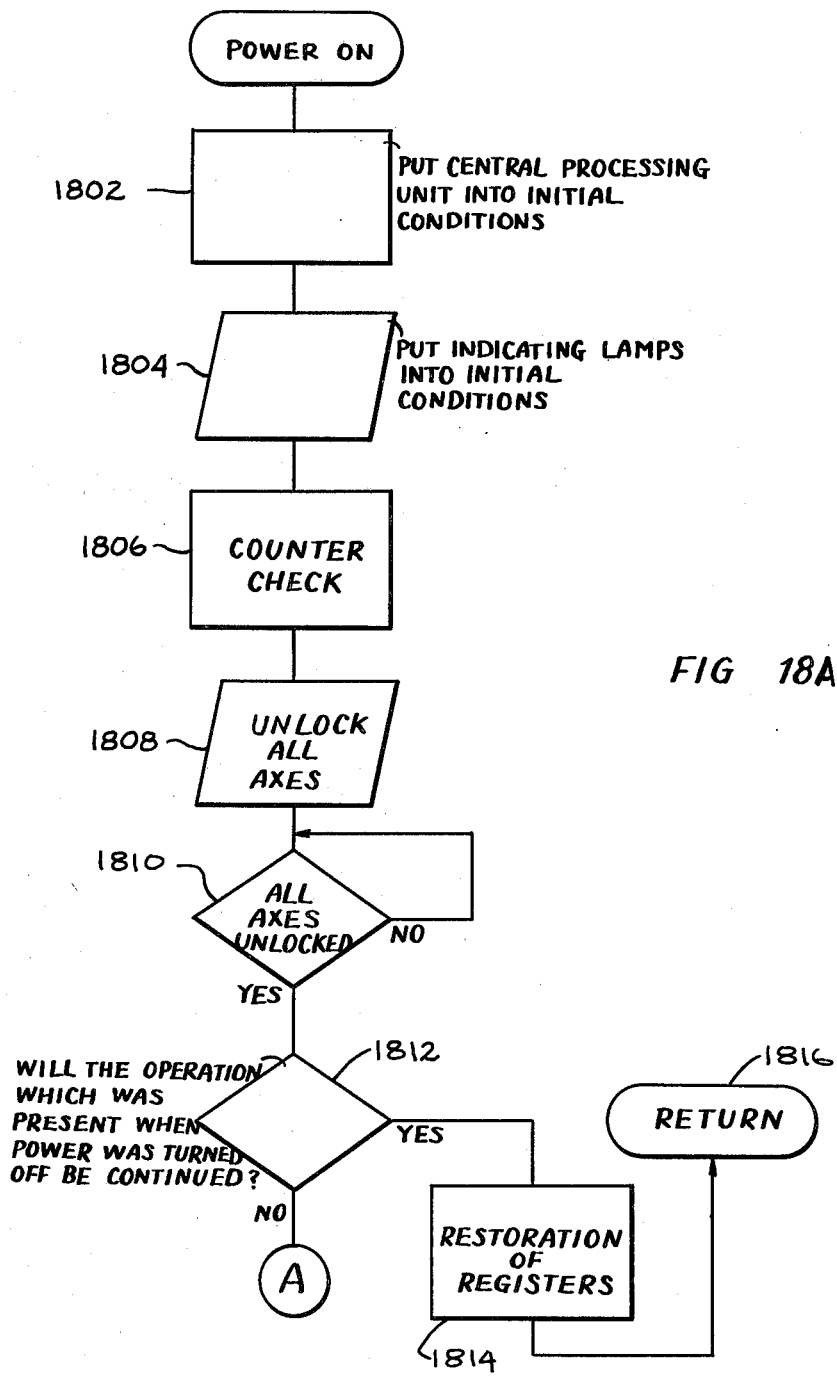

Thus, in the flowchart of FIGS. 18A, B and C showing the contents of the program, when power is applied to the control box 400 and panel 500, the central processing unit of the computer assumes the initial conditions (block 1802). Further, the various indicating lamps, that is, the indicating lamps (including an alarm lamp associated with error occurrence and indicating lamps associated with program correction and addition) provided on the surfaces of the control box 400 and panel 500 are brought into their initial conditions (block 1804). Next, the counters for the respective control axes in the computer 410 are tuned to, for example, the contents of potentiometers providing outputs indicating the present or actual positions of the respective control axes (block 1806). The control axes are rendered unlocked (block 1808). Further, after confirming that all the control axes have been unlocked (block 1810), it is decided whether or not the operation prior to the application of power should be continued (block 1812). If it is necessary to continue said operation, the register and the like will be reloaded with their conditions established prior to the application of power, and, though not shown, the previously executed program will be resumed (blocks 1814, 1816).

If it is not to be continued, the conditions of the switches (not shown) on the panel 500 will be patrolled (block 1818). And, if the switch for addition, manual operation or correction has been depressed (block 1820), such switch is read (block 1822) and according to the contents thus read, the indicating lamp (not shown) on the panel 500 corresponding to said switch is lighted. The said term "addition" refers to an instruction given when adding a program during the test mode given in which a program once taught is played back step by step for testing. The term "manual" refers to an instruction for manually controlling the movement of the welding torch 109 and of the workpiece attaching tool 105 along the control axes when teaching a program by playback. The term "correction" refers to an instruction for manually correcting the contents once programed, during the manual operation or teaching.

At this time, an interrupt mask associated with the memory is set (block 1824). The corresponding U/D switch (not shown) provided on the panel 500 is "on" in view of manual opeeration (decision block 1826). If there is no touch signal (block 1828) from the touch signal outputting means TO, the numerical value indicating the present position within the memory is counted up or down according to whether said U/D switch is up or down (block 1832). If said numerical value is found to be within a range in which the control axes are allowed to move (block 1834), then the data on said position is outputted as an instruction for position. At the same time, the instruction velocity resulting from the manual operation of a velocity instruction switch (not shown) provided on the panel 500 is also outputted as an instruction velocity (block 1836). If said numerical value is found to be outside said range, then the separately prepared limit value in the allowable range of movement is given to the numerical value of position within the memory means 403 in preference to instructions from the U/D switch bkock 1838, and this numerical value of position is outputted as an instruction position (block 1836).

If there is a signal from said touch signal outputting means TO (block 1828), a separately prepared constant value is added to the numerical value of position within the memory means 403 in a direction opposite to the direction of the manually operated U/D switch (block 1830), and this value is outputted as an instruction position (block 1836). This will now be described as an example of actual movement of the automatic welding apparatus 100. Suppose that the operator manipulates the U/D switch for a control axis (for example, Y axis) provided on the panel 500 to move the attaching tool 105 close to the torch 109. In this case, if the attaching tool 105 touches the torch 109 by accident, then a touch signal is produced and, according to the above described program, the attaching tool 105 is retracted by a fixed amount in a direction opposite to the direction in which it has been moving up to now. As a result, damage to the machine components can be avoided.

After a position instruction such as one described above is outputted, if a clock signal or null signal condition occurs with respect to all the control axes, then said preset interrupt mask is released and the information about the instruction position within the memory 440 (FIG. 2) is recorded at another address ( a location prepared for writing the user program) in the memory 440 by manually operating an unillustrated write instruction switch provided on the panel 500.

Figure 18B:
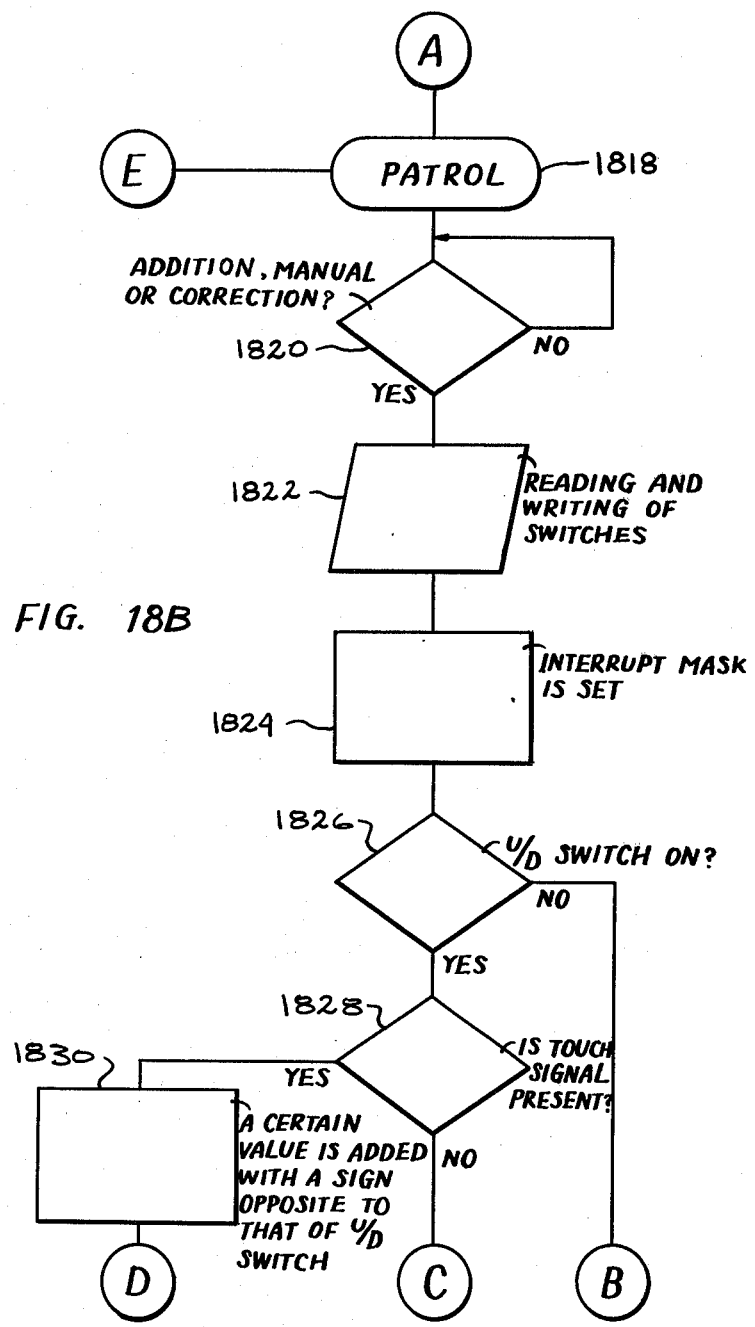

And, the above described patrol operation (block 1818-FIG. 18B) is resumed.

As for the above words "separately prepared constant value", the value may be constant under any conditions and it is possible to prepare a table such that the higher the instruction velocity, the greater, the value, so that the higher the speed at which a touch takes place, the greater the distance of retraction, thereby achieving a more effective operation.

The "clock signal condition" mentioned above is a condition which occurs when a reduced velocity region (non-saturated) is reached, from a servo system adapted to execute position control in an unillustrated manner, while the "null signal condition" is a signal condition which occurs produced when an instruction position is attained. (See FIG. 8.)

A description will now be given particularly of a case where the control box 400 contains a control circuit 420, (FIG. 19) using hardware constructed especially to embody the present invention.

Figure 19:
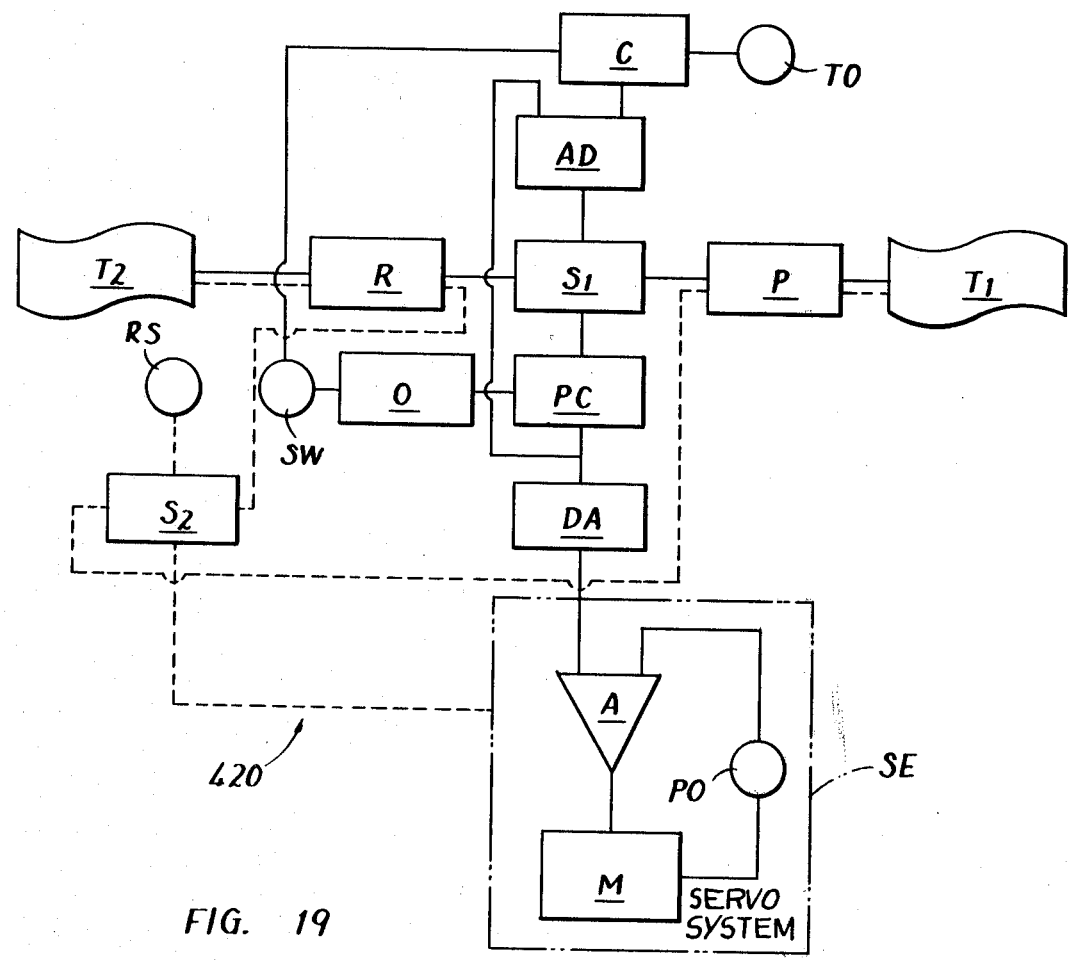
FIG. 19 is a block diagram of another embodiment.

In FIG. 19, T1 and T2 denote a punched tape; R denotes a reader; P denotes a puncher; s1 and s2 denote shift registers; PC denotes a presettable up-down counter; O denotes an oscillator; C denotes a constant value output circuit; AD denotes an adder; Rs denotes a velocity instruction rotary switch; DA denotes a D/A converter; A denotes a differential amplifier; M denotes an object to be controlled (in this embodiment, the workpiece attaching tool 105 or welding torch 109); PO denotes a potentiometer; SW denotes the above described U/D switch; and TO denotes the above described touch signal outputting means. These components are of known construction and connected in the manner shown. Especially, the differential amplifier A, controlled object M and potentiometer PO constitute a position control servo system SE.

In the case of this embodiment, no system program is, of course, prepared.

The function of this arrangement will now be described. During the teaching time, when the U/D switch SW is manually operated, the oscillator O is actuated and, according to whether the U/D switch is up or down, the contents of the counter PC increase or decrease. The contents of the counter PC are converted by the D/A converter DA into an analog value which is then inputted into the servo system SE to effect position control of the controlled object M. On the other hand, the contents of the counter PC are also inputted into the adder AD, but the arrangement is such that, when there is no signal from the signal outputting means TO, the output from the constant value output circuit C is "zero" and, therefore, the value inputted into the adder AD passes into the counter PC via the shift register S1. Eventually, the contents of the counter PC varies by an amount corresponding to the number renewed by the oscillator O and, as described above, the controlled object is position-controlled in response to the switch SW being manually operated. By manually operating an unillustrated write instruction switch at a suitable time, the contents of the shift register S1 are used for punching the tape T1 by the puncher P.

Further, at the time of said operation, the switch RS is manually operated to give a velocity instruction. The instruction numerical value outputted by the switch RS passes into the servo system SE via the shift register S2 and the velocity during said position control is controlled. Further, by the operation of said write instruction switch, the tape T1 is also punched by the puncher P according to the contents of the shift register S2.

During the manual operation of the switch SW, if the welding torch 109 (FIG. 1) touches an object to cause the signal outputting means TO (FIG. 19) to output a signal, then the constant value output circuit C feeds the adder AD with a predetermined constant value with a suitable sign given thereto (for example, a plus sign for "down", so as to give a variation due to said constant value in a direction opposite to the direction in which the value of the counter PC varies) according to the input of said output and according to whether the switch SW is "up" or "down". Therefore, the contents of the shift register S1 become the same as the contents of the counter PC plus or minus said constant value, and the resulting value is inputted into the counter PC. After all, the controlled object will be moved by a constant amount in a direction opposite to the direction in which it has been moving up to now. The operator then stops operating the switch SW, thereby putting an end to the manual operation.

Figure 18C:
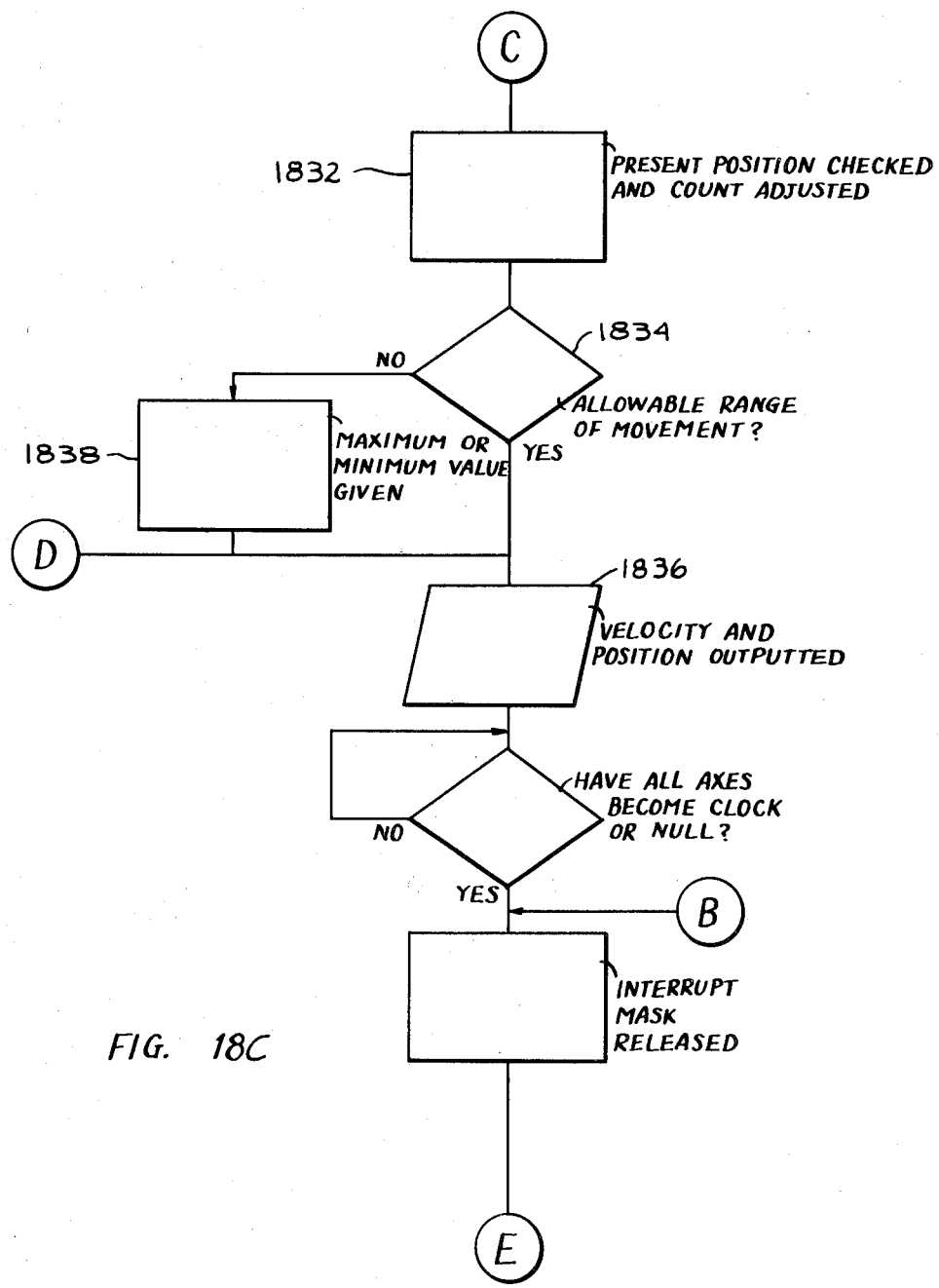

When the programing of the tape T1 is completed by repeating the above procedure, the tape is renamed T2 and fed to the tape reader R and the value thus read is inputted into the shift registers S1 and S2. Via the counter PC, the position instruction value enters the converter DA, whose analog output value controls the servo system SE. Further, the velocity instruction value controls the servo system SE through the shift register S2, and the controlled object M will move at the programmed velocity while having its position controlled. In the above description, the contents of the constant value output circuit C have been taken as constant, but, as in the case of embodiment shown in FIG. 18, it may be so arranged that it outputs an absolute value which is the greater, the higher the instruction velocity.

The present invention is not limited to the embodiments described above. For example, in modes other than the teaching mode, a touch may be detected to provide an output signal for moving the controlled object backward.

Heretofore, there have been various apparatuses which perform automatic welding while controlling the relative position between the welding torch and a workpiece, but the workpiece attaching device is integral with such automatic welding apparatus. Therefore, these conventional automatic welding apparatuses are limited in their applications. For example, they are used exclusively for welding long-sized workpieces, cubic workpieces or circular flat platelike workpieces. Therefore, when it is desired to automatically weld workpieces of various shapes as described above, a plurality of automatic welding apparatuses each adapted for one of these different workpieces must be used, this being uneconomical.

According to a further preferred embodiment of the present invention, which is accomplished in view of the above described circumstances, there is provided an automatic welding apparatus wherein three types of workpiece attaching devices are prepared which are adapted to be selectively attached to the automatic welding apparatus, thereby enabling most of the arrangement of a single such automatic welding apparatus to be used in common with said three types of workpiece attaching devices.

Such embodiment will now be described in more detail with reference to FIGS. 20 through 23. The reference numerals indicate the following:

1 . . . A base. Denoted as 1a is a guide groove formed in the base 1 and extending in a right-and-left direction (or the direction of arrow X shown in FIGS. 20 through 22), said groove serving to guide workpiece attaching devices to be described later.

2 . . . A guide fixed to the base 1 in the X direction.

3 . . . A movable body supported on the guide 2 for movement in the X direction.

4 . . . A hollow arm supported by the movable body and movable in a back-and-forth direction (or the direction of arrow Y). At one end (read end), the arm has a downwardly directed hollow body 4a integral therewith.

5 . . . A column supported at the front end of the arm 4 and movable in a vertical direction (or the direction of arrow Z).

Figure 24:
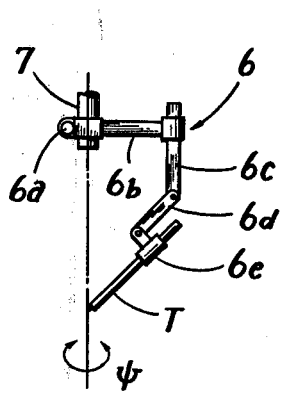
FIG. 24 is a detailed view of a torch holding device.

6 . . . A torch holding device supported at the lower end of the column 5 and rotatable around a vertical shaft 7 (in the direction of arrow $\phi$). In this embodiment, the holding device 6 comprises, with reference to FIG. 24, a horizontal arm 6b removably attached to the lower end of the shaft 7 by a bolt 6a, a vertical arm 6c fixed to the front end of said arm 6b, a rod 6d articulated to the lower end of said arm 6c, and a torch attaching element 6e articulated to the front end of said rod 6d.

T . . . A torch (in the embodiment, a MIG welding torch) attached to the element 6e of the holding device 6.

8 . . . Weight balance means which, in the embodiment, comprises a wire 8a which is fixed at one end thereof to the lower end of the column 5, is passed around pulleys 8b and 8c rotatably mounted on horizontal shafts at the front and rear ends of the arm 4 in the hollow space of the latter and has a weight 8d suspended from the other end thereof. The weight 8d exists in the hollow space of the hollow body 4a. In addition, the weight 8d is designed so that its weight is substantially equal to the total weight of the column 5, holding device 6 and torch T.

9 . . . A reel for a consumable electrode wire attached to the lower portion of the hollow body 4.

Three types of workpiece attaching devices A, B and C which are capable of being selectively attached to the base 1 will now be described.

Figure 20:
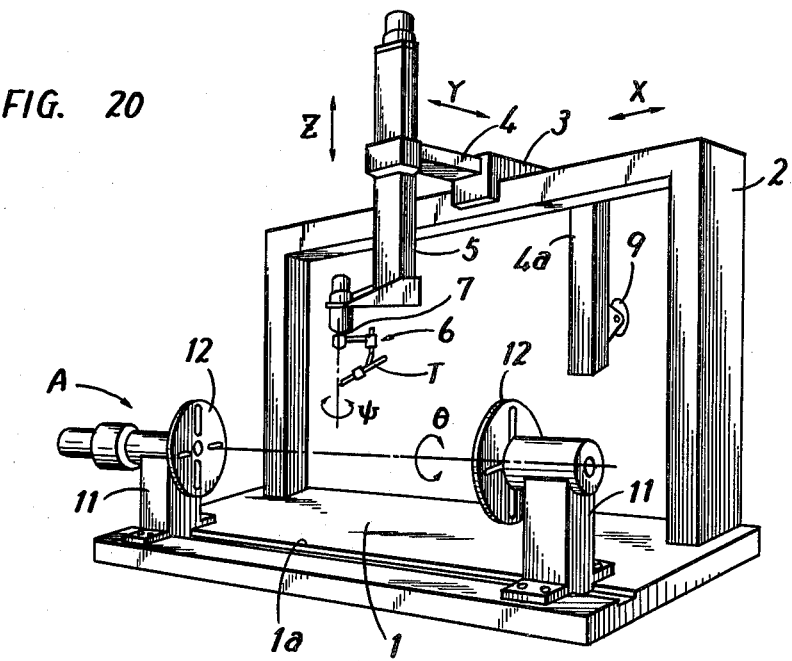
FIGS. 20 and 22 are partly omitted perspective views of an automatic welding apparatus having different workpiece attaching devices mounted thereon.

In the case of the attaching device A shown in FIG. 20:

11 . . . Two main bodies guided in the groove 1a and adapted to be attached to the base 1 by bolts at any suitable positions on the base.

12 . . . Workpiece attaching elements (in the embodiment, circular plates) supported by the main bodies 11 for rotation around an axis parallel with the X direction (that is, in the direction of arrow $\theta$ shown) and disposed face to face with each other, one circular plate 12 being adapted to be driven, the other being free to rotate. In addition, the circular plates 12 each have 4 radially elongated holes through which it is possible to attach workpiece attaching jigs.

Figure 21:
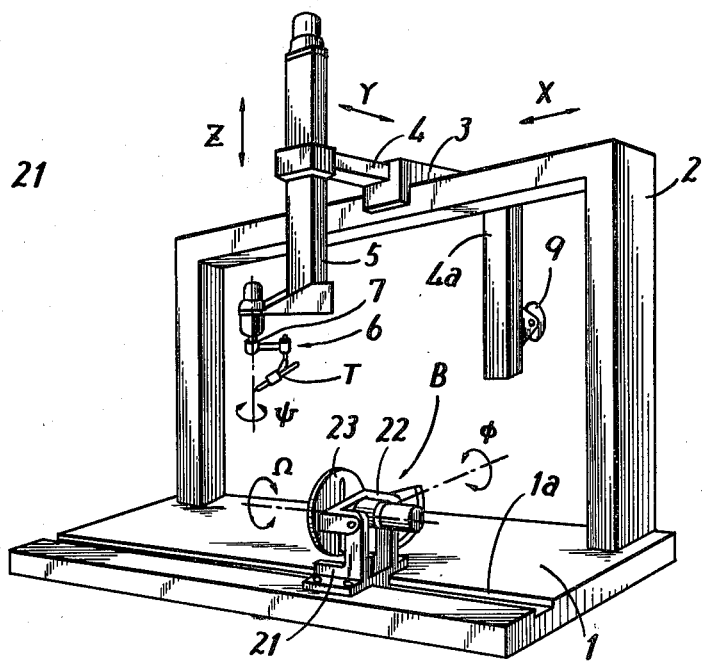

In the case of the attaching device B shown in FIG. 21:

21 . . . A main body guided in the groove 1a and adapted to be attached to the base 1 at any suitable position by bolts.

22 . . . A frame body which, in this embodiment is supported by the main body 21 for rotation around an axis parallel with the Y direction (that is, in the direction of $\phi$ shown).

23 . . . A workpiece attaching element (in this embodiment, a circular plate) supported by the main body 21 for rotation around an axis which is at right angles with the rotatable shaft of the main body (that is, in the direction of arrow $\Omega$ shown). In addition, through not shown in detail, the circular plate 23 is formed with 4 radially elongated holes through which it is possible to attach a workpiece attaching jig.

Figure 22:
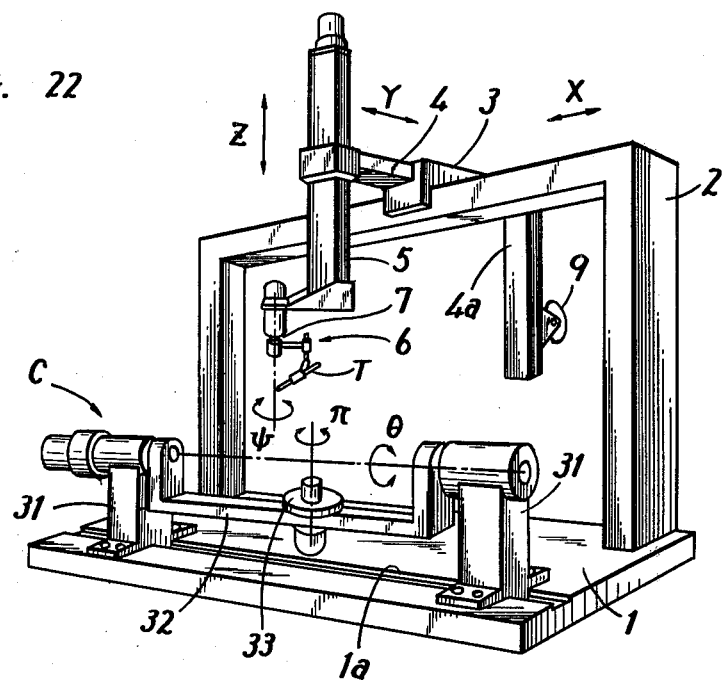
Figure 23:
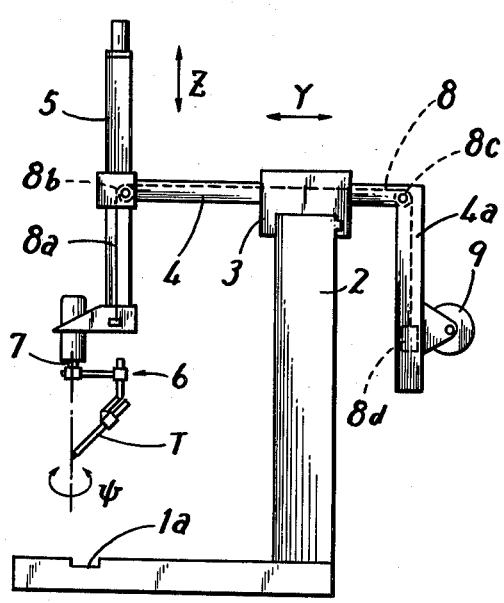
FIG. 23 is a side view, with such workpiece attaching device removed.

In the case of the attaching device C shown in FIG. 22:

31 . . . Two main bodies guided in the groove 1a and adapted to be attached to the base 1 at any suitable positions by bolts.

32 . . . A U-shaped frame body supported by the main bodies 31 for rotation around an axis parallel with the X direction (that is, in the direction of $\theta$ shown).

33 . . . A workpiece attaching element supported by the frame body 32 in the middle and on the inner side of the bottom of the U so as to be rotatable around an axis which is at right angles with the axis of rotation of the frame body (that is, in the $\pi$ direction shown).

Now, if the attaching device A is attached to the base 1, as shown in FIG. 20, this is suitable for welding (in the embodiment, butt welding) something like the boom of a crane, or long-sized workpieces, such as U-shaped steel members W1 and W2, as shown in FIGS. 25 and 26. In addition, when workpieces of different lengths are handled, the two main bodies 11 may be moved along the groove 1a to suitably determine the spacing between the two circular plates 12 and then be fixed on the base 1.

Further, if the attaching device B is attached to the base 1, as shown in FIG. 21, this is suitable particularly for welding (in the embodiment, fillet welding) a substantially rocket-shaped projection W4 to one side of a cubic workpiece, for example, a box W3, as shown in FIGS. 27 and 28.

Further, if the attaching device C is attached to the base 1, as shown in FIG. 22, this is suitable particularly for welding (in the embodiment, fillet welding) 8 reinforcing members W6 radially to a circular flat plate-like workpiece which is easy to fix at its center and which has locations to be welded on both surfaces thereof, for example, a large gear wheel W5 on both surfaces thereof, as shown in FIGS. 29 and 30.

In order to allow the welding point of the welding torch T to follow the welding line, the positions in the X, Y, Z, $\psi$, $\theta$, $\phi$, $\Omega$ and $\pi$ directions may be programmed in an unillustrated control device to perform automatic welding.

In addition, in this automatic welding apparatus, the balancing device 8 (FIG. 23) between the column 5 and the arm 4 precludes the possibility of overloading the power device which moves the column 5 in the Z direction. Further, since the hollow body 4a is integrally provided at the rear end of the arm 4 and the reel 9 is attached to the lower portion of the hollow body 4a, it follows that the hollow body 4a and the reel 9 are effective from the standpoint of balance across the arm 4, and, moreover, it is possible to lower the center of gravity of the system of the arm 4, column 5 and holding device 6, thereby facilitating the handling of the reel.

Figure 31:
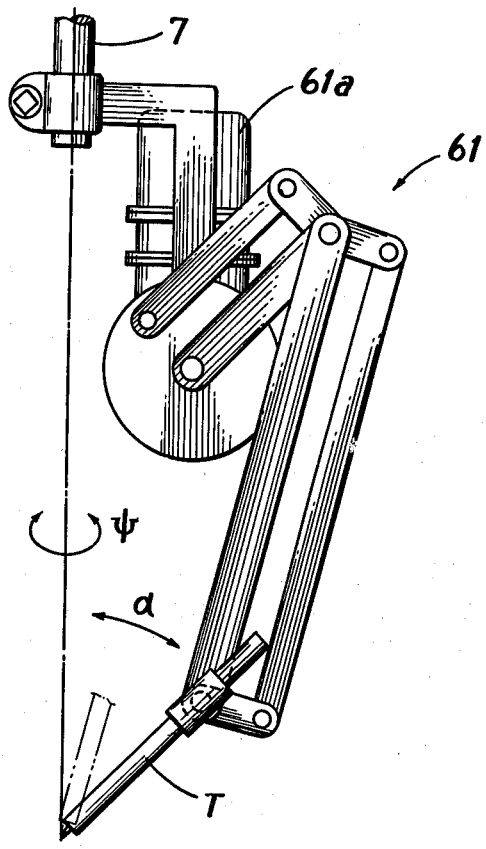
FIGS. 31 and 32 are views explanatory of different torch holding devices.
Figure 32:
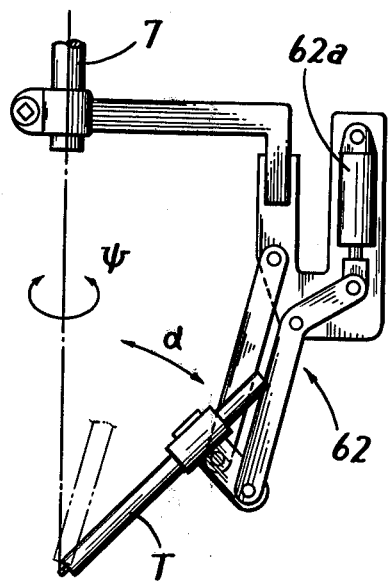

Further, for example, when it is necessary to use a plurality of welding means for butt welding or fillet welding workpieces, torch holding devices 61 and 62 shown in FIGS. 31 and 32 may be attached to the shaft 7 instead of attaching the holding device 6. In addition, the holding device 61 is known in the art, comprising a combination of two parallelogram linkages adapted to be rotated by a motor 61a so as to rotate the torch T in the direction of arrow $\alpha$ shown in FIG. 31. The holding device 62 is also known in the art, comprising a single four-unequally-sided figure linkage adapted to be rotated by an actuator 62a so as to rotate the torch T in the direction of arrow $\alpha$ shown in FIG. 32.

The invention is not limited to the above embodiment. For example, in the case of the workpiece attaching device B shown in FIG. 21, it may be so arranged that the frame body 22 is rotatable around an axis parallel with the X direction while the workpiece attaching element 23 is rotatable around an axis which is at right angles with the axis of rotation of the frame body 22. Further, in the case of the workpiece attaching device C shown in FIG. 22, since the frame body 32 is U-shaped, the power device for rotating the same would suffer a corresponding increase in the turning moment and in order to prevent this the frame body 32 may be provided with a balancer. Further, in the case of the workpiece attaching device C shown in FIG. 22, the two main bodies 31 may be dispensed with and instead the frame body 32 may be arranged so as to be attachable to the shafts supporting the workpiece attaching elements 12 of the workpiece attaching device A of FIG. 20. Replacement of other parts by their equivalents is included in the technical scope of the invention.

As has been described so far (FIGS. 20-23), according to the present invention;

(a) the movable body 3 carries an arm 4 movable in the Y direction; said arm 4 carries a column 5 movable in the Z direction; and said column carries a holding device 6. In this arrangement, therefore, as compared with an automatic welding apparatus wherein the movable body 3 carries a column 5 movable in the Z direction; said column 5 carries an arm 4 movable in the Y direction; and said arm carries a holding device 6, it is possible to reduce the height of the guide 2 when the minimum and maximum levels of the welding point of the torch T above the base 1 are the same for these two arrangements; and (b) since three types of attaching devices A, B and C are prepared which are capable of being selectively attached to the base 1, a long-sized workpiece, a large workpiece which is to be fillet welded only locally, and a circular flat platelike workpiece which is easy to fix at its center and has locations to be welded on both surfaces thereof can be attached each to a suitable one of said attaching devices A, B and C and automatically welded, and most of the arrangement of a single such automatic welding apparatus can be used in common with the attaching devices A, B and C, thus making it no longer necessary to provide a plurality of automatic welding apparatuses as in the prior art.

As described above, according to this embodiment, unique effects can be achieved as follows.

(1) In response to that one of the signal conditions, clock or null, which is earlier (in terms of timing) when the axes X, Y, Z, $\theta$ and $\phi$ reach the respective instruction positions indicated by the CPU, the position of the next point to be interpolated is computed and the result is given to the automatic welding apparatus. As a result, the movement of each axis is very smooth. That is, if only the null signal condition is responded to, it is not until the stoppage that the position instruction is given, so that the movement would be attended with unevenness of velocity (or become jerky). Since the movement of each axis is continuous and smooth as described above, the finish of the welding is improved. Another merit is that the life of the movable parts is prolonged.

(2) In each interpolation mode, when the next point to be interpolated is computed, the fractional part of a decimal fraction is discarded and considered to be the remainder which is used as an error component, and such remainders are added up until the sum exceeds a predetermined value, whereupon a value is added to or subtracted from the result of the computation of said next interpolation point. Therefore, even if a microprocessor, which is relatively low in the computing speed and is inexpensive, is used as a CPU, the processing speed can be increased to a practicable level. Therefore, the CPU becomes very inexpensive.

(3) In each interpolation mode, since position instructions are given individually with respect to the individual axes X, Y, Z, $\theta$ and $\phi$, welding (position control) in any direction of attitude becomes possible. Therefore, when the attitude of a workpiece is very involved or when one operating mode is switched to another, there is no need to recorrect the direction in which the workpiece is attached, thus facilitating the operation. Therefore, even at the time of arcuate or circular interpolation, the Z and $\phi$ axes can also be corrected. Further, in the case of weaving interpolation, it is not necessary to cause the welding line to follow any one of the X, Y and Z axes. Thus, the positioning of a workpiece when it is attached is simple and easy to perform.

(4) In order to effect linear velocity control when making a linear interpolation or rotative velocity control when rotating the workpiece, it is only necessary to set the resultant velocity, so that the preparation of a program becomes very simple and the repeatability and versatility of a program are improved.

(5) According to a preferred embodiment of the invention, since it is so arranged that an instruction for the position of the next interpolation point is given in response to that one of the signal conditions, clock or null, which is obtained earlier, there is provided a position control device which is of the PTP type and yet provides a more continuous and smoother movement than do other types which respond, for example, to only a null signal condition.

(6) According to a preferred embodiment of the invention, since it is so arranged that information about the position of a point to be weaving-interpolated and about the weaving pitch is given individually with respect to the individual axes, there is provided a very simple and easy-to-operate automatic welding apparatus wherein it is no longer necessary to position the welding line or determine the direction of movement of the torch with respect to any specific axis of the coordinate system.

(7) Velocity correction or position correction in the test mode or automatic operation mode is simple and the operability and accuracy or test speed is improved.

In addition, in the above embodiments, each axis has been described as having its position control range restricted to 4096 bits, but this numerical value may be suitably changed, if necessary.

Further, in the above embodiments, the invention has been described by taking, as an example, the position control involved in an automatic welding apparatus, but it goes without saying that the invention is not limited to welding apparatuses and is applicable to any machine tools that require position control.

As has been described so far, according to the invention, position control according to a preset velocity can be achieved by a very simple setting and operation, as compared with conventional NC apparatuses.

Although this invention has been described and illustrated in detail, it is to be clearly understood that the same is by way of illustration and example only and is not to be taken by way of limitation, the spirit and scope of this invention, being limited only by the terms of the appended claims.

What is claimed is:

1. In an automatic welding system comprising means for fixing a workpiece and means for holding a welding torch, said workpiece fixing means and said welding torch holding means having a mutual positional relationship with respect to each other in terms of an at least two-axis coordinate system and at least one of said workpiece fixing means and said welding torch holding means being movably mounted for allowing adjustment of said mutual positional relationship of said workpiece fixing means and said welding torch holding means in terms of said at least two axes of the coordinate system; a method for controlling adjustment of said mutual positional relationship, said method comprising the steps of:

(a) presetting position information concerning at least two positions, comprising at least an origin point and a destination point, between which said at least one of said workpiece fixing means and said welding torch holding means is to be moved through a plurality of interpolation points;

(b) presetting composite velocity information concerning the composite velocity of movement by said at least one of said workpiece fixing means and said welding torch holding means between said at least two positions;

(c) determining pitch information concerning said at least two axes based on said preset position information concerning said at least two positions for utilization of said pitch information with respect to a first one of said at least two positions and at each successive interpolation point;

(d) determining velocity component information concerning the velocity components, in terms of said at least two axes of the coordinate system, of said preset composite velocity of movement for utilization of said velocity component information with respect to a first one of said at least two positions and at each successive interpolation point;

(e) determining, based on said pitch information, a next successive interpolation point through which said at least one of said workpiece fixing means and said welding torch holding means is to pass;

(f) determining whether or not said next successive interpolation point exceeds said destination point;

(g) if said next successive interpolation point does not exceed said destination point, providing said velocity component information concerning the velocity components, determined in terms of said at least two axes of the coordinate system, as velocity commands of the respective axes, driving said at least one of said workpiece fixing means and said welding torch holding means in the directions of said axes in response to said determined velocity component information concerning the velocity components, determining whether or not there exists at least one of a clock condition and null condition defining reduced velocity of said at least one of said workpiece fixing means and said welding torch holding means, and, if said at least one of a clock condition and null condition does exist, repeating steps (c) through (g) for said next successive interpolation point; and (h) if said next successive interpolation point does exceed said destination point, providing said preset position information and said preset velocity information concerning said destination point, and driving said at least one of said workpiece fixing means and said welding torch holding means in the directions of said axes in response to said provided preset position information and said preset velocity information concerning said destination point.

2. A method in accordance with claim 1, wherein said workpiece fixing means is provided for rotation about an axis, whereby said workpiece fixing means is rotatable about said axis, and which further comprises the steps of determining the distance of the welding point of said workpiece from the rotation axis of said workpiece fixing means, determining a rotation velocity of said workpiece fixing means based on said determined distance from said rotation axis such that the peripheral velocity of said welding point may be equal to said preset velocity information concerning the velocity of passage, and rotating said workpiece fixing means in response to the determined rotation velocity.

3. A method in accordance with claim 1, which further comprises the steps of commanding the positions to be interpolated in succession by arithmetic operation based on said preset position information concerning the positions, and position controlling said at least one of said workpiece fixing means and said welding torch holding means individually and simultaneously in said at least two axes for each of said successive positions to be interpolated in accordance with the result of said arithmetic operation, whereby interpolation is effected between said two positions.

4. A method in accordance with claim 3, wherein said automatic welding system comprises servo means for successively positioning said at least one of said workpiece fixing means and said welding torch holding means to the positions as successively operated based on the preset position information, said servo means being structured to generate a position associated signal when said at least one of said workpiece fixing means and said welding torch holding means is positioned to the position as successively operated, said successive operation being commanded responsive to said position associated signal obtained from said servo means during a preceding position control period.

5. A method in accordance with claim 4, said servo means including a drive member, and wherein said position associated signal has a first condition representative of approach of said drive member toward said position, and a second condition representative of said drive member being in the vicinity of said position, and said successive operation is commanded responsive to at least one of said first and second conditions of said position associated signal in accordance with whichever condition, is detected earlier, associated with the position of said drive member from said servo means during the preceding position control period.

6. A method in accordance with claim 5, wherein said servo means includes a servo amplifier and exhibits a velocity characteristic having a saturation characteristic with a non-saturated region, and wherein said first condition of said position associated signal is a clock signal condition indicating that said drive member has reached said non-saturated region of said velocity characteristic of said servo means, and said second condition of said position associated signal is a null signal condition indicating that said drive member is in the vicinity of said position.

7. A method in accordance with claim 4, wherein said preset position information concerning the positions to be preset comprises information concerning the positions in terms of the axes of said three coordinate, and said drive member is position controlled individually and simultaneously in the directions of said axes.

8. A method in accordance with claim 7, wherein said position information concerning the positions to be preset comprises information concerning at least two different points, and
said successive operation comprises an operation for interpolation between said two points.

9. A method in accordance with claim 3, which further comprises the steps of
presetting position information concerning the points for one weaving cycle including a starting point of the weaving and a terminating point of the weaving in terms of the axes of said at least two axis coordinate system,
determining a weaving pitch based on said position information concerning the respective points of said one weaving cycle, and
determining information concerning the respective successive weaving points up to said terminating point of the weaving based on said weaving pitch and said position information concerning the respective points of said one weaving cycle, separately for each of said at least two axes of said at least two axis coordinate system, whereby said welding torch holding means is responsive to the result of said operation for driving said at least one of said workpiece fixing means and said welding torch holding means until the same reaches said terminating point of the weaving for effecting the weaving operation.

10. A method in accordance with claim 9, which further comprises the step of determining whether said welding torch holding means reaches said terminating point of the weaving based on the information in terms of that one axis of said coordinate system for which the component is the largest.

11. A method in accordance with claim 3, which further comprises the steps of
judging whether information for commanding correction of said preset information is present during the movement of said one means, and
effecting said position control in accordance with said correction commanding information after said correction commanding information is present.

12. A method in accordance with claim 11, wherein said correction commanding information comprises said information concerning the velocity, and said respective components are determined based on said information concerning the corrected velocity, whereby a new velocity is commanded with respect to the respective axes.

13. A method in accordance with claim 11, wherein said correction commanding information comprises said information concerning the points to be interpolated.

14. A method in accordance with claim 11, wherein said correction commanding informaytion comprises the information concerning a target position.

15. A method in accordance with claim 11, wherein said presetting is corrected based on said correction commanding information.

16. A method in accordance with claim 11, wherein said correction commanding information is not preset.

17. A method in accordance with claim 1, which further comprises the step of checking an error in said presetting step of said position information, and wherein said error checking step comprises the steps of
judging whether a program writing command is present or not,
judging whether a welding command is present or not, and
checking the preset information, whereby the presetting error is judged if said writing command is present, said welding command is present and said preset information is improper.

18. A method in accordance with claim 17, wherein said preset information comprises step information.

19. A method in accordance with claim 18, wherein a presetting error is judged when said step information is of a top step.

20. A method in accordance with claim 17, wherein said preset information comprises information concerning the velocity.

21. A method in accordance with claim 20, wherein a presetting error is judged when said information concerning the velocity is of a predetermined value which is different from that corresponding to an ordinary welding velocity.

22. A method in accordance with claim 1, which further comprises the steps of
generating a signal indicating that said at least one of said workpiece fixing means and said welding torch holding means comes in contact with another article, and
controlling the position of said one means in the direction away from said contacted another article.

23. A method in accordance with claim 22, said apparatus including an up/down switch, wherein said opposite direction controlling step comprises the steps of
(a) judging whether said up/down switch has been manually operated and said contact signal has been obtained,
(b) if and when said judgement in said step (a) is yes, adding a predetermined value to the present position in the sign opposite to the operated information by said up/down switch,
(c) if and when said judgement in said step (a) is no, substracting the position information from the present position in accordance with the operated information by said up/down switch, and
(d) providing the position information as a result of said step (b) or (c) by way of the commanded position information.

24. A method in accordance with claim 23, wherein said predetermined value is adapted to be obtained based on a table corresponding to said commanded velocity.

25. In an automatic welding system comprising means for fixing a workpiece and means for holding a welding torch, said workpiece fixing means and said welding torch holding means having a mutual positional relationship with respect to each other in terms of an at least two-axis coordinate system and at least one of said workpiece fixing means and said welding torch holding means being movably mounted for allowing adjustment of said mutual positional relationship of said workpiece fixing means and said welding torch holding means in terms of said at least two axes of the coordinate system; a method for controlling adjustment of said mutual positional relationship, said method comprising the steps of
presetting position information concerning at least two positions between which said at least one of said workpiece fixing means and said welding torch holding means is to be moved,
presetting composite velocity information concerning the composite velocity of movement by said at least one of said workpiece fixing means and said welding torch holding means between said at least two positions,
evaluating direction information concerning the direction of the movement of said at least one of said workpiece fixing means and said welding torch holding means at each of said positions based on said preset position information concerning said at least two positions,
evaluating velocity component information concerning the velocity components, in terms of said at least two axes of the coordinate system, of said preset composite velocity of movement based on said evaluted direction information concerning the direction of the movement and said preset composite velocity information concerning the composite velocity of movement,
providing said velocity component information concerning the velocity components, evaluated in terms of said at least two axes of the coordinate system, as velocity commands of the respective axes, and
driving said at least one of said workpiece fixing means and said welding torch holding means in the directions of said axes in response to said evaluated velocity component information concerning the velocity components, said method further comprising the steps of
discarding fractions less than a predetermined digit on the occasion of the arithmetic operation of said positions to be interpolated, while the residuals are left as an error component,
accumulating said error component at each arithmetic operation, and
correcting the successive positions to be interpolated, as operated, if and when said accumulated error components reach a predetermined value, thereby to obtain a position to be interpolated, as corrected.

26. A method in accordance with claim 25, wherein said discarding of fractions less than a predetermined digit is for less than a decimal point.

27. A method in accordance with claim 26, wherein said correcting step comprises adding or subtracting a predetermined value.

28. A method in accordance with claim 27, wherein said preset position information concerning said at least two positions comprises position information concerning two different points, and said interpolation comprises rectilinear interpolation.

29. A method in accordance with claim 27, wherein said preset position information concerning said at least two positions comprises position information concerning at least three different points, and said interpolation comprises a circular or arcuate interpolation.

30. In an automatic welding system comprising means for fixing a workpiece and means for holding a welding torch, said workpiece fixing means and said welding torch holding means having a mutual positional relationship with respect to each other in terms of an at least two-axis coordinate system and at least one of said workpiece fixing means and said welding torch holding means being movably mounted for allowing adjustment of said mutual positional relationship of said workpiece fixing means and said welding torch holding means in terms of said at least two axes of the coordinate system; a method for controlling adjustment of said mutual positional relationship, said method comprising the steps of
presetting position information concerning at least two positions between which said at least one of said workpiece fixing means and said welding torch holding means is to be moved,
presetting composite velocity information concerning the composite velocity of movement by said at least one of said workpiece fixing means and said welding torch holding means between said at least two positions,
evaluating direction information concerning the direction of the movement of said at least one of said workpiece fixing means and said welding torch holding means at each of said positions based on said preset position information concerning said at least two positions,
evaluating velocity component information concerning the velocity components, in terms of said at least two axes of the coordinate system, of said preset composite velocity of movement based on said evaluted direction information concerning the direction of the movement and said preset composite velocity information concerning the composite velocity of movement, providing said velocity component information concerning the velocity components, evaluated in terms of said at least two axes of the coordinate system, as velocity commands of the respective axes, and driving said at least one of said workpiece fixing means and said welding torch holding means in the directions of said axes in response to said evaluated velocity component information concerning the velocity components, wherein said method further comprises the steps of commanding the positions to be interpolated in succession by arithmetic operation based on said preset position information concerning the positions, and position controlling said at least one of said workpiece fixing means and said welding torch holding means individually and simultaneously in said at least two axes for each of said successive positions to be interpolated in accordance with the result of said arithmetic operation, whereby interpolation is effected between said two positions, said method further comprising the steps of presetting position information concerning the points for one weaving cycle including a starting point of the weaving and a terminating point of the weaving in terms of the axes of said at least two-axis coordinate system, determining a weaving pitch based on said position information concerning the respective points of said one weaving cycle, and determining information concerning the respective successive weaving points up to said terminating point of the weaving based on said weaving pitch and said position information concerning the respective points of said one weaving cycle, separately for each of said at least two axes of said at least two-axis coordinate system, whereby said welding torch holding means is responsive to the result of said operation for driving said at least one of said workpiece fixing means and said welding torch holding means until the same reaches said terminating point of the weaving for effecting the weaving operation, said method further comprising the step of determining whether said welding torch holding means reaches said terminating point of the weaving based on the information in terms of that one axis of said coordinate system for which the component is the largest, wherein the step of evaluating said weaving pitch based on the position information concerning the respective points of said one weaving cycle comprises the steps of discarding fractions less than a predetermined digit position, while the residual is left as an error component, accumulating said error component for each one weaving cycle, and correcting the position information concerning the respective points of the weaving as operated whenever said accumulated error component reaches a given value.

31. An automatic welding apparatus, comprising:

means for fixing a workpiece, means for holding a welding torch, said workpiece fixing means and said welding torch holding means having a mutual positional relationship with respect to each other in terms of an at least two-axis coordinate system, means for movably mounting at least one of said workpiece fixing means and said welding torch holding means for allowing adjustment of said mutual positional relationship of said workpiece fixing means and said welding torch holding means in terms of said at least two axes of the coordinate system, and a control circuit for controlling adjustment of said mutual positional relationship;

said control circuit comprising:

storage means for storing information necessary for adjustment of said mutual positional relationship, data processing means responsive to said information from said storage means for providing data necessary for said adjustment, and a controlling mechanism responsive to said data from said data processing means for controlling adjustment of said mutual positional relationship;

said storage means being preloaded with position information concerning at least two positions, comprising at least an origin point and a destination point, between which said at least one of said workpiece fixing means and said welding torch holding means is to be moved through a plurality of interpolation points, and composite velocity information concerning the composite velocity of movement by said at least one of said workpiece fixing means and said welding torch holding means between said at least two positions;

said data processing means comprising:

first means for determining pitch information concerning said at least two axes based on said preloaded position information concerning the said at least two positions for utilization of said pitch information with respect to a first one of said at least two positions and at each successive interpolation point;

second means for determining velocity component information concerning the velocity components, in terms of said at least two axes of the coordinate system, of said preloaded composite velocity of movement for utilization of said velocity component information with respect to a first one of said at least two positions and at each successive interpolation point;

third means for determining, based on said pitch information, a next successive interpolation point through which said at least one of said workpiece fixing means and said welding torch holding means is to pass;

fourth means for determining whether or not said next successive interpolation point exceeds said destination point fifth means for, if said next successive interpolation point does not exceed said destination point, providing said velocity component information concerning the velocity components as determined with respect to said at least two axes of the coordinate system, as velocity commands of the respective axes;

sixth means for, if said next successive interpolation point does not exceed said destination point, driving said at least one of said workpiece fixing means and said welding torch holding means in the directions of said axes in response to said determined velocity component information concerning the velocity components;

seventh means for, if said next successive interpolation point does not exceed said destination point, determining whether or not there exists at least one of a clock condition and null condition, defining reduced velocity of said at least one of said workpiece fixing means and said welding torch holding means;

if said at least one of a clock condition and null condition does exist, said respective first, second, third, fourth, fifth, sixth and seventh means repeating their respective functions for each successive interpolation point so long as said at least one of said clock condition and said null condition does exist;

eighth means for, if said next successive interpolation point does exceed said destination point, providing said preset position information and said preset velocity information concerning said destination point; and ninth means for, if said next successive interpolation point does exceed said destination point, driving said at least one of said workpiece fixing means and said welding torch holding means in the directions of said axes in response to said provided preset position information and said preset velocity information concerning said destination point;

whereby said control mechanism is responsive to said continuously evaluated velocity component information concerning the velocity components for driving said at least one of said workpiece fixing means and said welding torch holding means in the directions of said axes.

32. An apparatus in accordance with claim 31, wherein said workpiece fixing means is provided for rotation about an axis, whereby said workpiece fixing means is rotatable about said axis, said data processing means further comprises:

means for determining the distance of the welding point of said workpiece from the rotation axis of said workpiece fixing means, and means for determining a rotation velocity of said workpiece fixing means based on said determined distance from said rotation axis such that the peripheral velocity of said welding point may be equal to said preset velocity information concerning the velocity of passage;

said control mechanism comprises means responsive to the determined rotation velocity for rotating said workpiece fixing means.

33. An apparatus in accordance with claim 31, wherein said data processing means further comprises:

means for commanding the positions to be interpolated in succession by arithmetic operation based on said preset position information concerning the positions, and said controlling mechanism is structured to position control said at least one of said workpiece fixing means and said welding torch holding means individually and simultaneously in said at least two axes for each of said successive positions to be interpolated in accordance with the result of said arithmetic operation, whereby interpolation is effected between said two positions.

34. An apparatus in accordance with claim 33, wherein said storage means is preloaded with position information concerning the points for one weaving cycle including a starting point of the weaving and a terminating point of the weaving in terms of the axes of said at least two axis coordinate system, said data processing means comprises:

means for determining a weaving pitch based on said position information concerning the respective points of said one weaving cycle, and means for determining information concerning the respective successive weaving points up to said terminating point of the weaving based on said weaving pitch and said position information concerning the respective points of said one weaving cycle, separately for each of said at least two axes of said at least two axis coordinate system, whereby said welding torch holding means is responsive to the result of said operation for driving said at least one of said workpiece fixing means and said welding torch holding means until the same reaches said terminating point of the weaving for effecting the weaving operation.

35. An apparatus in accordance with claim 34, wherein said data processing means comprises means for determining whether said welding torch holding means reaches said terminating point of the weaving based on the information in terms of that one axis of said coordinate system for which the component is the largest.

36. An apparatus in accordance with claim 33 wherein said data processing means comprises means for judging whether information for commanding correction of said preset information is present during the movement of said at least one of said workpiece fixing means and said welding torch holding means, and said controlling mechanism is structured to effect said position control in accordance with said correction commanding information after said correction commanding information is present.

37. An apparatus in accordance with claim 36, wherein said correction commanding information comprises said information concerning the velocity, and said respective components are evaluated based on said information concerning the corrected velocity, whereby new velocity is commanded with respect to the respective axes.

38. An apparatus in accordance with claim 36, wherein said correction commanding information compsises said information concerning the points to be interpolated.

39. An apparatus in accordance with claim 36, wherein said correction commanding information comprises the information concerning a target position.

40. An apparatus in accordance with claim 36, wherein said presetting is corrected based on said correction commanding information.

41. An apparatus in accordance with claim 36, wherein said correction commanding information is not preset.

42. An apparatus in accordance with claim 33, wherein said controlling mechanism comprises servo means for successively positioning said at least one of said workpiece fixing means and said welding torch holding means to the positions as successively operated based on the preset position information, said servo means generating a position associated signal when said at least one of said workpiece fixing means and said welding torch holding means is positioned to the position as successively operated, said successive operation being commanded responsive to said position associated signal obtained from said servo means during a preceding position control period.

43. An apparatus in accordance with claim 42, said servo means including a drive member, and wherein said position associated signal has a first condition representative of approach of said drive member toward said position, and a second condition representative of said drive member being in the vicinity of said position, and said successive operation is commanded responsive to at least one of said first and second conditions of said position associated signal in accordance with whichever condition is detected earlier, associated with the position of said drive member, from said servo means during the preceding position control period.

44. An apparatus in accordance with claim 43, wherein said servo means includes a servo amplifier and exhibits a velocity characteristic having a saturation characteristic with a non-saturated region, and wherein said first condition of said position associated signal is a clock signal condition indicating that said drive member has reached said non-saturated servo region of said velocity characteristic of said servo means, and said second condition of said position associated signal is a null signal condition indicating that said drive member is in the vicinity of said position.

45. An apparatus in accordance with claim 42, wherein said preset position information concerning the positions to be preset comprises information concerning the positions in terms of the axes of said three coordinate, and said drive member is position controlled individually and simultaneously in the directions of said axes.

46. An apparatus in accordance with claim 45, wherein said position information concerning the positions to be preset comprises information concerning at least two different points, and
said successive operation comprises an operation for interpolation between said two points.

47. An apparatus in accordance with claim 31, wherein said data processing means further comprises means for checking an error in said presetting step of said position information, and wherein said error checking means comprises
means for judging whether a program writing command is present or not,
means for judging whether a welding command is present or not, and
means for checking the preset information so as to judge the presetting error if said writing command is present, said welding command is present and said preset information is improper.

48. An apparatus in accordance with claim 47, wherein said preset information comprises information concerning the velocity.

49. An apparatus in accordance with claim 48, comprising means for judging a presetting error when said information concerning the velocity is of a predetermined value which is different from that corresponding to an ordinary welding velocity.

50. An apparatus in accordance with claim 47, wherein said preset information comprises step information.

51. An apparatus in accordance with claim 47, comprising means for judging a presetting error when said step information is of a top step.

52. An apparatus in accordance with claim 31, wherein said controlling mechanism comprises
means for generating a signal indicating that said at least one of said workpiece fixing means and said welding torch holding means comes in contact with another article, and
means for controlling the position of said at least one of said workpiece fixing means and said welding torch holding means away from said contacted another article.

53. An apparatus in accordance with claim 52, said apparatus including an up/down switch, wherein said data processing means further comprises
means for judging whether said up/down switch has been manually operated and said contact signal has been obtained,
means responsive to said up/down switch being manually operated, and responsive to said contact signal being obtained, for adding a predetermined value to the present position in the sign opposite to the operated information by said up/down switch,
means responsive to at least one of said up/down switch not being manually operated and said contact signal not being obtained for subtracting the position information from the present position in accordance with the operated information by said up/down switch, and
means for providing the position information as a result of at least one of said operation of said adding means and said operation of said subtracting means by way of the commanded position information.

54. An apparatus in accordance with claim 53 further comprising means for providing said predetermined value based on a table corresponding to said commanded velocity.

55. An automatic welding apparatus, comprising:
means for fixing a workpiece,
means for holding a welding torch,
said workpiece fixing means and said welding torch holding means having a mutual positional relationship with respect to each other in terms of an at least two-axis coordinate system,
means for movably mounting at least one of said workpiece fixing means and said welding torch holding means for allowing adjustment of said mutual positional relationship of said workpiece fixing means and said welding torch holding means in terms of said at least two axes of the coordinate system, and
a control circuit for controlling adjustment of said mutual positional relationship;
said control circuit comprising:
storage means for storing information necessary for adjustment of said mutual positional relationship,
data processing means responsive to said information from said storage means for providing data necessary for said adjustment, and
a controlling mechanism responsive to said data from said data processing means for controlling adjustment of said mutual positional relationship;
said storage means being preloaded with
position information concerning at least two positions between which said at least one of said workpiece fixing means and said welding torch holding means is to be moved, and composite velocity information concerning the composite velocity of movement by said at least one of said workpiece fixing means and said welding torch holding means between said at least two positions; said data processing means comprising means for evaluating direction information concerning the direction of the movement of said at least one of said workpiece fixing means and said welding torch holding means at each of said positions based on said preloaded position information concerning the said at least two positions, and means for evaluating velocity component information concerning the velocity components, in terms of said at least two axes of the coordinate system, of said preloaded composite velocity of movement based on said evaluated direction information concerning the direction of the movement of said preloaded preset information concerning the composite velocity of movement;

said control mechanism being responsive to said evaluated velocity component information concerning the velocity components for driving said at least one of said workpiece fixing means and said welding torch holding means in the directions of said axes;

wherein said data processing means further comprises:

means for commanding the positions to be interpolated in succession by arithmetic operation based on said preset position information concerning the positions;

said controlling mechanism being structured to position control said at least one of said workpiece fixing means and said welding torch holding means individually and simultaneously in said at least two axes for each of said successive positions to be interpolated in accordance with the result of said arithmetic operation, whereby interpolation is effected between said two positions;

wherein said data processing means further comprises:

means for discarding fractions less than a predetermined digit on the occasion of the arithmetic operation of said positions to be interpolated, while the residuals are left as an error component, means for accumulating said error component at each arithmetic operation, and means for correcting the successive positions to be interpolated, as operated, if and when said accumulated error components reach a predetermined value, thereby to obtain a position to be interpolated, as corrected.

56. An apparatus in accordance with claim 55, wherein said discarding of fractions less than a predetermined digit is for less than a decimal point.

57. An apparatus in accordance with claim 56, wherein said arithmetic operation is addition or subtraction.

58. An apparatus in accordance with claim 57, wherein said preset position information concerning said at least two positions comprises position information concerning two different points, and said interpolation comprises rectilinear interpolation.

59. An apparatus in accordance with claim 57, wherein said preset position information concerning said at least two positions comprises position information concerning at least three different points, and said interpolation comprises a circular or arcuate interpolation.

60. An automatic welding apparatus, comprising:

means for fixing a workpiece, means for holding a welding torch, said workpiece fixing means and said welding torch holding means having a mutual positional relationship with respect to each other in terms of an at least two-axis coordinate system, means for movably mounting at least one of said workpiece fixing means and said welding torch holding means for allowing adjustment of said mutual positional relationship of said workpiece fixing means and said welding torch holding means in terms of said at least two axes of the coordinate system, and a control circuit for controlling adjustment of said mutual positional relationship;

said control circuit comprising:

storage means for storing information necessary for adjustment of said mutual positional relationship, data processing means responsive to said information from said storage means for providing data necessary for said adjustment, and a controlling mechanism responsive to said data from said data processing means for controlling adjustment of said mutual positional relationship;

said storage means being preloaded with position information concerning at least two positions between which said at least one of said workpiece fixing means and said welding torch holding means is to be moved, and composite velocity information concerning the composite velocity of movement by said at least one of said workpiece fixing means and said welding torch holding means between said at least two positions; said data processing means comprising means for evaluating direction information concerning the direction of the movement of said at least one of said workpiece fixing means and said welding torch holding means at each of said positions based on said preloaded position information concerning the said at least two positions, and means for evaluating velocity component information concerning the velocity components, in terms of said at least two axes of the coordinate system, of said preloaded composite velocity of movement based on said evaluated direction information concerning the direction of the movement of said preloaded preset information concerning the composite velocity of movement;

said control mechanism being responsive to said evaluated velocity component information concerning the velocity components for driving said at least one of said workpiece fixing means and said welding torch holding means in the directions of said axes, wherein said storage means is preloaded with position information concerning the points for one weaving cycle including a starting point of the weaving and a terminating point of the weaving in terms of the axes of said at least two-axis coordinate system, said data processing means comprises:

means for determining a weaving pitch based on said position information concerning the respective points of said one weaving cycle, and means for determining information concerning the respective successive weaving points up to said terminating point of the weaving based on said weaving pitch and said position information concerning the respective points of said one weaving cycle, separately for each of said at least two axes of said at least two-axis coordinate system, whereby said welding torch holding means is responsive to the result of said operation for driving said at least one of said workpiece fixing means and said welding torch holding means until the same reaches said terminating point of the weaving for effecting the weaving operation, wherein said data processing means comprises means for determining whether said welding torch holding means reaches said terminating point of the weaving based on the information in terms of that one axis of said coordinate system for which the component is the largest, wherein said means for evaluating said weaving pitch based on the position information concerning the respective points of said one weaving cycle comprises:

means for discarding fractions less than a predetermined digit position, while the residual is left as an error component, means for accumulating said error component for each one weaving cycle, and means for correcting the position information concerning the respective points of the one weaving cycle as operated whenever said accumulated error component reaches a given value.

* * * * *

UNITED STATES PATENT AND TRADEMARK OFFICE
CERTIFICATE OF CORRECTION

PATENT NO. : 4,179,602

DATED : December 18, 1979

INVENTOR(S) : Maruyama et al.

It is certified that error appears in the above—identified patent and that said Letters Patent is hereby corrected as shown below:

Column 2, line 22, "in" should be --is--;
          line 63, "such a" should be --such an--;
          line 65, "objects" should be --object--.

Column 5, line 20, "TO" should be --TO;--.

Column 7, line 38, "4111" should be --411$\ell$--;
          line 59, "4231" should be --423$\ell$--;
          line 61, "4231" should be --423$\ell$--.

Column 9, line 50, "known" should be --know--;
          line 58, "rspective" should be --respective--.

Column 11, line 39, "thought," should be --thought of,--;
         *line 55, "6A" should be --6D--;
          line 60, "check shown in FIG. 6A" should be --check (block 650) shown in FIG. 6D--.

Column 12, line 15, "658)," should be --650),--;
          line 57, delete the third occurrence of "the";
          line 58, before "welding" insert --the--;
          line 61, "5031, lamp 5051, lamp 5071 and lamp 4241," should be --503$\ell$, lamp 505$\ell$, lamp 507$\ell$ and lamp 424$\ell$,--.

Column 14, line 38, "at a" should be --at $\underline{a}$--; "at b" should be --at $\underline{b}$-- (italics);
          line 50, "axis" should be --axes--.

UNITED STATES PATENT AND TRADEMARK OFFICE
CERTIFICATE OF CORRECTION

PATENT NO. : 4,179,602

DATED : December 18, 1979        PAGE 2 OF 3

INVENTOR(S) : Maruyama et al.

It is certified that error appears in the above—identified patent and that said Letters Patent is hereby corrected as shown below:

Column 15, line 7, "$V_{74}$" should be --$V_\theta$--.

Column 16, about line 3, the phrase --1 (indicating bits),-- should be inserted level to and immediately to the right of "$\pm$" at the end of the equation;

about line 5, delete "1 (indicating bits),--;

about line 7, "$X_n = X_n + 1$" should be --$X_n = X_n \pm 1$--;

about line 9, the square root symbol should be extended to cover all the terms on the right-hand side of the "$\pm$", as follows: $\sqrt{(x_2-x_1)^2 + (y_2-y_1)^2 + (z_2-z_1)^2}$ ;

line 51, "on" should be --or--.

Column 22, about line 29, the square root symbol should be extended to cover all the terms on the right-hand side of the "=", as follows: $\sqrt{(x_3-x_1)^2 + (y_3-y_1)^2 + (z_3-z_1)^2}$ .

Column 23, line 46, "$\pm 1$" should be --+1--.

Column 26, line 14, "(block 1418 1420)." should be --(blocks 1418, 1420).--;

line 28, delete "(block 1418)";

line 29, ""on"." should be --"on" (block 1418).--.

Column 27, line 57, "not" should be --(not--;

line 60, "unit" should be --unit;--;

line 61, "not" should be --(not--;

UNITED STATES PATENT AND TRADEMARK OFFICE
CERTIFICATE OF CORRECTION

PATENT NO. : 4,179,602

DATED : December 18, 1979        PAGE 3 OF 3

INVENTOR(S) : Maruyama et al.

It is certified that error appears in the above—identified patent and that said Letters Patent is hereby corrected as shown below:

line 62, delete "pattern";

line 63, "like, the" should be --like.  The--.

Column 28, line 12, "parts)." should be --parts.)--.

Column 29, line 6, "bkock 1838" should be --(block 1838)--;

line 46, after "velocity" insert --(non-saturated)--;

line 47, delete "(non-saturated)";

line 49, "a signal" should be --a--;

line 50, delete "produced".

Column 30, line 68, "of" should be --of the--.

Column 31, line 2, delete the first occurrence of "the".

*Column 32, line 38, "through" should be --though--.

*Column 33, line 62, "invention;" should be --invention:--.

Signed and Sealed this

Twenty-seventh Day of October 1981

[SEAL]

Attest:

GERALD J. MOSSINGHOFF

Attesting Officer        Commissioner of Patents and Trademarks